United States Patent [19]

Waters et al.

[11] Patent Number: 4,787,081
[45] Date of Patent: Nov. 22, 1988

[54] TIME DIVISION MULTIPLEX EQUIPMENT FOR USE IN DATA TRANSMISSION EQUIPMENT

[75] Inventors: Derek B. Waters, Chelmsford; Michael J. Sexton, Basildon, both of England

[73] Assignee: STC PLC, London, England

[21] Appl. No.: 6,699

[22] Filed: Jan. 22, 1987

[30] Foreign Application Priority Data

Jan. 22, 1986 [GB] United Kingdom ............. 8601545

[51] Int. Cl.⁴ ............................. H04J 3/22; H04J 3/12
[52] U.S. Cl. ...................................... 370/85; 370/67; 370/84
[58] Field of Search .............. 370/67, 85, 58, 84

[56] References Cited

U.S. PATENT DOCUMENTS

| | | | |
|---|---|---|---|
| 4,390,982 | 6/1983 | Williams et al. | 370/67 |
| 4,488,290 | 12/1984 | Dunn et al. | 370/67 |
| 4,511,969 | 4/1985 | Koenig et al. | 370/85 |
| 4,541,088 | 9/1985 | Sarson | 370/67 |
| 4,542,501 | 9/1985 | Chavalet et al. | 370/85 |
| 4,611,321 | 9/1986 | Gabrielli et al. | 370/67 |
| 4,635,253 | 1/1987 | Urui et al. | 370/67 |
| 4,674,083 | 6/1987 | Rackin | 370/85 |
| 4,697,262 | 9/1987 | Segal et al. | 370/85 |

Primary Examiner—Douglas W. Olms
Assistant Examiner—Melvin Marcelo
Attorney, Agent, or Firm—Lee & Smith

[57] ABSTRACT

A data transmission equipment, known as a primary digital multiplex (PDMX) consists of a bus structure formed by parallel lines on a printed circuit board, with the circuit units (1,2,3,4,5) on printed circuit cards set at right angles to the bus structure. The circuit units include a control unit (1,2) also called a core facilities unit, which acts as an interface to one or more 2Mb/sec. trunks, and so-called tributary units (3,4,5) which give access to subscriber and other outlets.

Various networks using one or more such PDMX equipment are described.

The signalling and control arrangements for the equipment use a signalling processing unit (2) and a tone processor (6). The signalling processing unit monitors the bus for signals and line conditions and issues signals appropriately. The tone processor functions in a generally similar manner.

Note that PDMX is one of STC PLC Trade Marks.

15 Claims, 12 Drawing Sheets

TIME DIVISION MULTIPLEX EQUIPMENT FOR USE IN DATA TRANSMISSION EQUIPMENT

BACKGROUND TO THE INVENTION

The present invention relates to data transmission equipment, and especially to such equipment which is flexible and economical. The invention also concerns signalling techniques for use in association with such equipment.

The main trend in telecommunications at present is towards digital systems, and especially to such systems in which speech is conveyed in time division multiplex (TDM) manner using pulse code modulation (PCM). For speech handling in Great Britain the speech is usually sampled at 8 KHz, and each speech sample is conveyed by eight binary bits so that we get a 64 Kbit/sec channel. For an inter-exchange trunk it is usual to convey 32 such channels in TDM manner, which gives a 2048 Kbit/sec trunk, often referred to as a 2 Mbit/sec trunk. The numbers of channels may vary; thus in USA most PCM systems are 24 channel systems. The present invention is applicable to such systems with different numbers of channels.

It will be appreciated that other bit rates exist on subscribers' channels especially where data is handled. However, it is still common practice to assemble the channels onto the 2048 Kbit/sec trunks. Thus when all the bandwidth is in use, such a trunk may be handling less than the full number of 31 subscriber channels. Note that one of the 32 channels on the trunk is usually used for synchronization, and another channel may be used for common channel signalling. Assembling the lower bit rate channels onto the higher bit rate trunks involves multiplexing; in addition it is necessary to be able to "disassemble", i.e. to demultiplex, from the higher bit rate trunks to the lower bit rate channels.

BACKGROUND PRIOR ART

An example of a system in which such assembly and "disassembly" is done is described in U.S. Pat. No. 4,494,231 (Slawy et al). In that system, the subscribers' lines, each of which may be circuit-switched (voice) or packet-switched (data) are connected in blocks of up to 31 to so-called connection modules. Each such module switches between the lines and a duplex 2.048 Mbit/sec trunk. Note that the lines can be of different bit rates.

The duplex high bit rate trunks are switched by a central switching array which interconnects input (as "seen" by the array) trunks and output (as "seen" by the array) trunks. These trunks all connect to respective connection modules, which give access to remote exchanges or other devices, in addition to lines.

Thus an incoming call reaches a connection module where it is multiplexed onto a high bit rate trunk. This is switched via the switching array to another high bit rate trunk which goes to another connection module from which it is demultiplexed to the appropriate outgoing line. Note that the outgoing lines can include lines to remote exchanges or to other devices.

SUMMARY OF THE INVENTION

An object of the invention is to provide an equipment which can perform functions similar to those of the connection module in the system of the above patent but in a more efficient and flexible manner.

According to the invention, there is provided data transmission equipment for handling data in digital form in time division multiplex manner, which includes an equipment rack with a member of insulating material which carries a common bus structure and has connection arrangements whereby a number of circuit units can be connected in so as to make contact with the bus structure, wherein:

(a) the equipment also includes a control unit fitted to one of the connection arrangements associated with the bus structure;

(b) the bus structure carries a number of parallel electrical circuit tracks each providing one of the bus conductors of the structure;

(c) when the equipment is in use tributary units are fitted into some at least of the connection arrangements, such that communication is possible between the control unit and any fitted-in tributary units;

(d) tributary units when present can be of different types providing different customer services, each such unit having its own address;

(e) the control unit acts as an interface to the equipment for at least one high bit-rate incoming outgoing trunk, such tributary units as are present providing interfaces for said customer services and customer lines; and (f) the control unit establishes connections as needed between channels on the high bit-rate trunk or trunks for which it is an interface and such tributary units as are present when the equipment is in use, connections between the control unit and such other units as are present being effected by messages sent over the bus structure, each of which is addressed with the address of the unit for which that message is destined.

According to the invention, there is also provided data transmission equipment, which includes a multiplex controller to which is connected at least one high bit-rate (e.g. 2048 Kbit/s) trunk to and from remote equipment, a plurality of tributary units each of which gives access to lower bit-rate (e.g. 64 kbit/s) highways, or to higher bit rate highways, or to analogue channels, which highways or channels may include highways to subscribers' equipment, a common bus structure having a set of electrical conductors forming highways for communications data and signalling data, and connections from said controller and said tributary units to the bus structure so that the highways thereof interconnect the controller and the tributary units, wherein the controller controls the extraction from the bit stream of a said high bit rate trunk of the respective communications data and its routing to the appropriate ones of the digital highways or analogue channels of the tributary units, wherein said routing is effected by the allocation of respective time slots on the highways of the bus structure and in the tributary units to the highways or channels thereof, wherein the controller includes storage means in which details of said time slot allocations are stored, wherein the controller and the tributary units are plug-in modules which plug into an equipment rack whose backplane carries said bus structure with the said modules connector-coupled to the bus structure, and wherein a said tributary unit can be plugged into any one of a number of different positions in the rack, the time slot allocation being effected under the control of the multiplex controller.

Thus it will be seen that a great deal of flexibility exists in that a number of different tributary unit types can be accommodated, each of which can be fitted into any one of a number of different positions on the rack.

Note that such a tributary unit can give access to low bit rate digital channels, high bit rate digital channels, analogue (usually speech) channels, and signalling channels. When a message is destined for a tributary unit it includes the address of an interface device on that tributary unit. This it is which enables that unit to be plugged in at a wide variety of positions in an equipment rack. When a time slot is allocated for a call using a tributary unit a message is sent which includes that unit's address and an identification of the allocated time slot. On reception at the tributary unit identified by that address, the message causes the unit's output highway for that call to be set to the allocated time slot. This time slot is then used over a duplex data highway from the control unit to the appropriate tributary unit.

As will be seen below, the control unit and the signalling and processing unit (when separate from the control unit) have fixed positions in the rack, whereas the tributary units have complete flexibility as to their locations. One example of the benefit of such an arrangement is where a rack is initially only partly equipped. If a new tributary unit is added in, it can be added wherever is mechanically convenient without the need to alter the positions of any other unit. Further, no alterations need to be made to the interfaces used to couple units to the bus. Such flexibility is not available in existing equipment, such as that of the above-mentioned U.S. Patent.

It many cases the high bit rate trunk or trunks connected to the control unit may have access, via the bus structure and the tributary units, to channels (highways) with more traffic-handling capacity than the trunk or trunks. Thus we would use a "deconcentration" function.

According to another aspect of the invention, there is provided data transmission equipment for handling data in digital form in time division multiplex manner, which includes a control unit which includes connection processing means, one or more tributary units, at least one additional processing unit which serves all of said tributary units, and a common bus structure to which all of said units are connected so that said units are interconnected, wherein:

(a) the control unit acts as an interface for at least one high bit-rate incoming/outgoing trunk to the equipment while each said tributary unit acts as an interface to one or more other data highways, which other highways may include lower bit-rate highways giving access to subscriber stations or analogue channels;

(b) the or each said additional processing unit handles data appropriate to connections to be set up or set up via the equipment, which data is additional to the intelligence content of said connections;

(c) the or each said additional processing unit effects said handling by monitoring the bus structure to ascertain the data or other information thereon relating to the connection;

(d) the or each said additional processing unit responds to the results of its said monitoring to generate further data or other information which is applied to the bus structure in a manner appropriate to the connection to which it relates; and (e) the or each said additional processing unit effects said monitoring and generation under the control of its own software.

DESCRIPTION OF THE DRAWINGS

Embodiments of the invention will now be described with reference to the accompanying drawings, in which.

DESCRIPTION OF PREFERRED EMBODIMENTS

Figure 1:
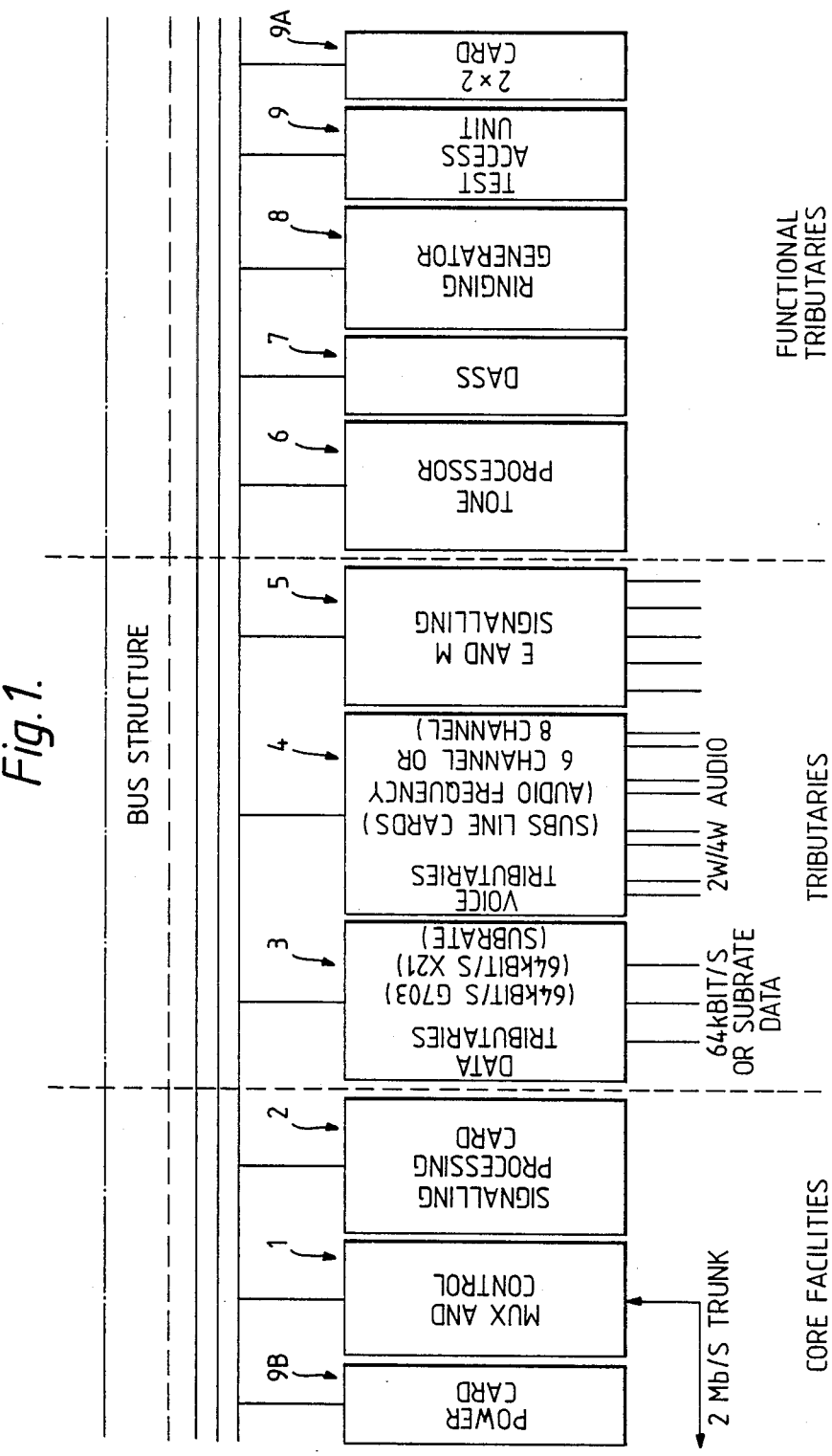
FIG. 1 is a highly schematic diagram illustrative of the functional areas of equipment embodying the invention.

As will be seen later the arrangement shown in FIG. 1, referred to as a PDMX equipment, is a first-order multiplex equipment, designed in accordance with relevant CCITT recommendations for a wide variety of multiplexing and processing applications.

The control portion of the arrangement consists of a power unit and a multiplex (MUX) controller mounted in an equipment shelf, in the present embodiment of the well-known TEP1-(E) type. The equipment is also available in the standard 19" equipment practice. These units are connected, see FIG. 2 below, to an interconnection bus on a backplane to which a number of interfacing and processing functions can be connected.

The power unit provides an interface between the primary power supply and power distribution conductors on the backplane. It may be part of the control unit. It can follow normal practice.

The MUX controller provides the main ports to which one or more 2048 Kbit/sec. trunks are connected, a V24 user port (not shown) for control and supervision, and arrangements for interfacing with more traditional relay-based alarms systems. These particular interfacing arrangements can follow established practice and so are not described herein. The 2048 kbit/sec ports can be configured for channel-associated signalling (CAS), or for common channel signalling (CCS) using time slot 16 (TS16). Time slot zero (TS0) is, as usual, used for synchronisation and related functions. CCITT recommended network maintenance strategies are supported, and access to spare bits is provided. This latter includes an option to use one of these spare bits as a 4 kbit/sec channel in "network management" applications. Note that 2048 kbit/sec trunks are often referred to as 2 Mbit/sec trunks.

The V24 user port referred to above can be "driven" from an "intelligent" (hand held) terminal or from a management computer, thus enabling the equipment to benefit from an integrated network management environment while allowing each integration into more traditional arrangements. One example of the use of a management computer will be found in our British Patent Specification No. 1467641 (G. G. Smith-D. G. Bryan 7-5), where such a computer is described as applied to a TXE4 telephone exchange.

Thus the MUX controller supports the system's data and control bus, which provides interconnection between individual interface or processing units, the tributary units referred to below, and the controller. User or application - dependent information as to the status and functions of these programmable units is stored in the controller in non-volatile random access memory (NVRAM) and transferred to the units via the bus structure.

The bus structure, which will be discussed in more detail later, consists of a set of parallelly-extending data highways, 24 in the present case, used for transferring data between units and for signalling between those units, using a 32 time slot structure. The highways include a control line (CIN) used for transferring a serial control message from the controller to any other plug-in unit, and an alarm supervision line (AS) used for transferring serial messages from plug-in units to the controller, including "mechanism" for contention resolution. The bus structure also deals with timing signals such as a 4 MHz clock for synchronisation, and power distribution.

In view of the wide variety of tributary units contemplated, a semi-custom bus interface device is used to support the basic functionality and can be used for all units, each of which is on a printed circuit card. Thus new card designs can exchange control and status messages with the MUX controller via the bus structure.

Figure 6:
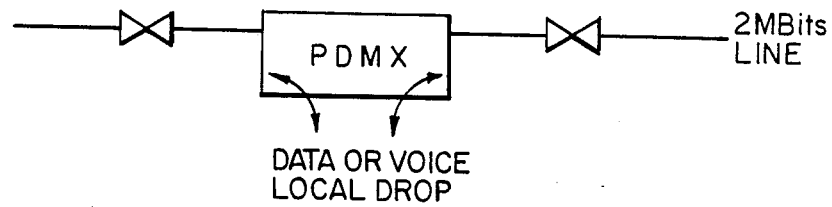
FIGS. 6 to 10 are schematic diagrams showing how equipment embodying the invention may be used, each block designated PDMX (Primary Distributed Multiplex) representing equipment such as that shown in FIG. 1. Note that PDMX is a Trade Mark of STC PLC.

The basic system concept which underlies the present equipment, FIGS. 1 and 6 embodies three areas, a control unit, also referred to as core facilities, a number of tributary units, and the common bus structure which provides a number of buses and which interconnects the above-mentioned units.

The core facilities unit includes a multiplex/demultiplex and control unit 1, which provides an interface between one or more 2 Mb/sec. trunks and the other requirements shown in FIG. 1. These trunks normally go to and from remote exchanges or the like, and one trunk is shown. The unit 1, which also has control functions, as will be seen later, is on a printed circuit card which plugs into the bus structure. Thus the core in the present case comprises one printed circuit card which carries a multiplexer-demultiplexer and power unit.

There is also shown in FIG. 1 a signalling and processing card 2, although in some cases its functions might be provided by the control portions of the card 1.

The tributary units, 3, 4, 5, 6, 7, 8, 9, 9A provide access to various outgoing digital or analog connections. The range of tributaries that can be connected to the backplane include :
(a) unit 3 giving access to six 64 Kbit/sec. data channels;
(b) unit 4 giving access to two and four-wire audio channels;
(c) unit 5 giving access to E & M signalling channels;
(d) unit 6, the tone processor which is one of the additional processing units referred to above, facilitates inband tone signalling;
(e) unit 7 accesses DASS signalling, DASS being a British Telecoms signalling protocol;
(f) unit 8 generates ringing current to be sent down the subscriber's line;
(g) unit 9 facilitates test access; and
(h) unit 9A facilitates digital branching, drop and insert at 2 Mbit/sec.

Each of these units needs one or more time slots on a nominated highway of the bus structure, which interconnects the units shown, which slots are allocated by the control unit 1. This latter also contains memory to keep records both of the time slot and highway allocations and of the nature of the channels to which those slots are allocated.

There is also a power supply unit 9B, which provides an interface between an external power supply and the equipment shown. It produces the voltages needed, which are supplied to the other units via buses on the backplane.

The speech tributary unit 4, provides an interface between two-wire or four-wire speech circuits and the buses on the backplane. It involves analogue-to-digital and digital-to-analogue conversion, and includes audio gain adjustment control, under MMI (Man-Machine Interface), control. The unit has front-end sockets for connection to speech channels. The unit 4 has a set of switches, one per speech channel, to control the two-wire or four-wire status of the unit.

Control messages are sent to the unit 4 and to others of the units connected to the bus structure, via the 4 Mbit/sec CIN bus, and give control over time slot allocation, input and output gain setting and status requests. Messages from the unit are sent on the 4 Mbit/sec AS line. Each of the speech channels can be assigned freely to a backplane data bus highway and time slot, but digital information can only be output to an even data highway and received from an odd data highway. Further, no two channels may be assigned to work in the same time slot on different highways.

We now consider the signalling tributary units, one of which is the E and M signalling unit, 5, in FIG. 1. This provides signalling facilities for a number of user terminations, so one such unit may be associated with two of the eight-channel audio units. Hence two such signalling units and four audio units such as unit 4, FIG. 1, serve the 30 user terminations allocated to time slots 1 to 15 and 17 to 31. The E and M signalling may be connected to channel associated signalling (CAS) in time slot 16 (TS16) using CCITT G703 and G732 protocols.

The E and M signalling comprise two "earth on" "earth off" signals to give the four conditions on-hook, off-hook, answer and clear. "Earth on" is a resistance of 1200 ohms to earth (plus a maximum of 450 ohms line resistance), while "earth off" is a resistance greater than 40 kilohms.

For CAS in TS16, each TS16 has eight bits and carries signalling information for two channels. Hence four bits, a, b, c, d, of signalling information are available for each channel every 16 frames, i.e. every 2 ms. However, in many cases only bit a is actually used.

Each E and M pair can be allocated to any time slot.

Next we consider the data access tributary unit 3, FIG. 1. This, as shown in FIG. 1, is a three-channel unit, but another variant, and the one to be discussed, is a six-channel unit. This provides six channels with ports which interface between the 64 Kbit/sec data services and the backplane highways. The interface can carry, in both transmit and receive directions, the 64 Kbit/sec data signal, the 64 KHz timing signal, and the 8 KHz timing signal.

This tributary unit has the following functions:

(a) in the transmit direction it multiplexes data from up to four 2.048 Mbit/sec input highways to the MUX and control unit 1, FIG. 1, into a continuous data stream containing data samples for up to 30 channels. The data is then extracted and transmitted on six channels as separate 64 Kbit/sec inverted (AMI) data streams;

(b) in the receive direction it performs the reverse of process (a);

(c) reversal of input and output highways;

(d) application of a loopback condition to a nominated channel, under MMI control, for remotely testing the unit's performance;

(e) generation of a 2 MHz reference clock signal from any one of the six 64 Kbit/sec input signals for use as a synchronising clock signal in the MUX and control unit 1, FIG. 1;

(f) accepts incoming signals, via Unit 1, for control of time slot and channel allocation, alarm indication, reference clock generation, loopback control, etc.

It can also indicate alarm settings when interrogated from the MMI.

Another data tributary unit type acts in a similar manner to the one just described for CCITT X21 64 Kbit/sec channels. This provides six channels with ports which interface between Data Terminating Equipment (DTE) and Data Connecting Equipment (DCE) in accordance with CCITT Recommendation X21.

There is also a 2×2 Mbit/sec Interface Tributary Unit 9A, with two modes of operation available:

(a) Dual MUX mode, in which two MUX/DEMUX circuits function independently.

(b) Drop/insert or spur MUX mode, in which a drop and insert, or spur mode of operation with time slot interchange is provided.

In the first of these modes, there are two MUX circuits, MUX A and MUX B, which are identical except that MUX A has additional control facilities. Each MUX circuit has the following functions:

(a) Multiplexing and demultiplexing 30 channels of speech or data into or from a composite 2.048 Mbit/sec data stream (HDB3), as per CCITT Recommendation G732.

(b) Control facilities required on any selected tributary.

(c) Time slot and channel allocation.

(d) A telemetry communications link to other similar systems.

(e) Alarm monitoring.

(f) Loopback facility so that either MUX can be tested from its 2 Mbit/sec port in digital-to-analogue mode.

In the second of the two modes, the signal streams from two bus highways are combined into a single 2.048 Mbit/sec data stream, which is presented to only one of the 2.048 Mbit/sec interface ports, provided that both the MUX circuits receive signals that enable them to synchronise to this port.

The variety of tributary unit types available as indicated above, plus the fact that there may be variants of different types, indicates the flexibility of the system. Each such unit has bus access units (BAUs), perhaps with more than one bus interface device (BID) to a BAU. A "wanted" tributary is thus selected by sending its address over the busses on the bus structure which functions as address buses, so that there is great flexibility in respect of unit location in the rack. This locational flexibility is by contrast with many known systems in which it is not available.

We now revert to FIG. 1. In the system shown unit 2 is an example of an intermediate processing function. When such a function is needed, data from the interface units is presented via the bus to the processing unit. Processed data is placed back on the bus in another highway ready for multiplexing and transmission. However, as already indicated, the functions of this unit 2 may in some cases be performed in the unit 1.

Figure 2:
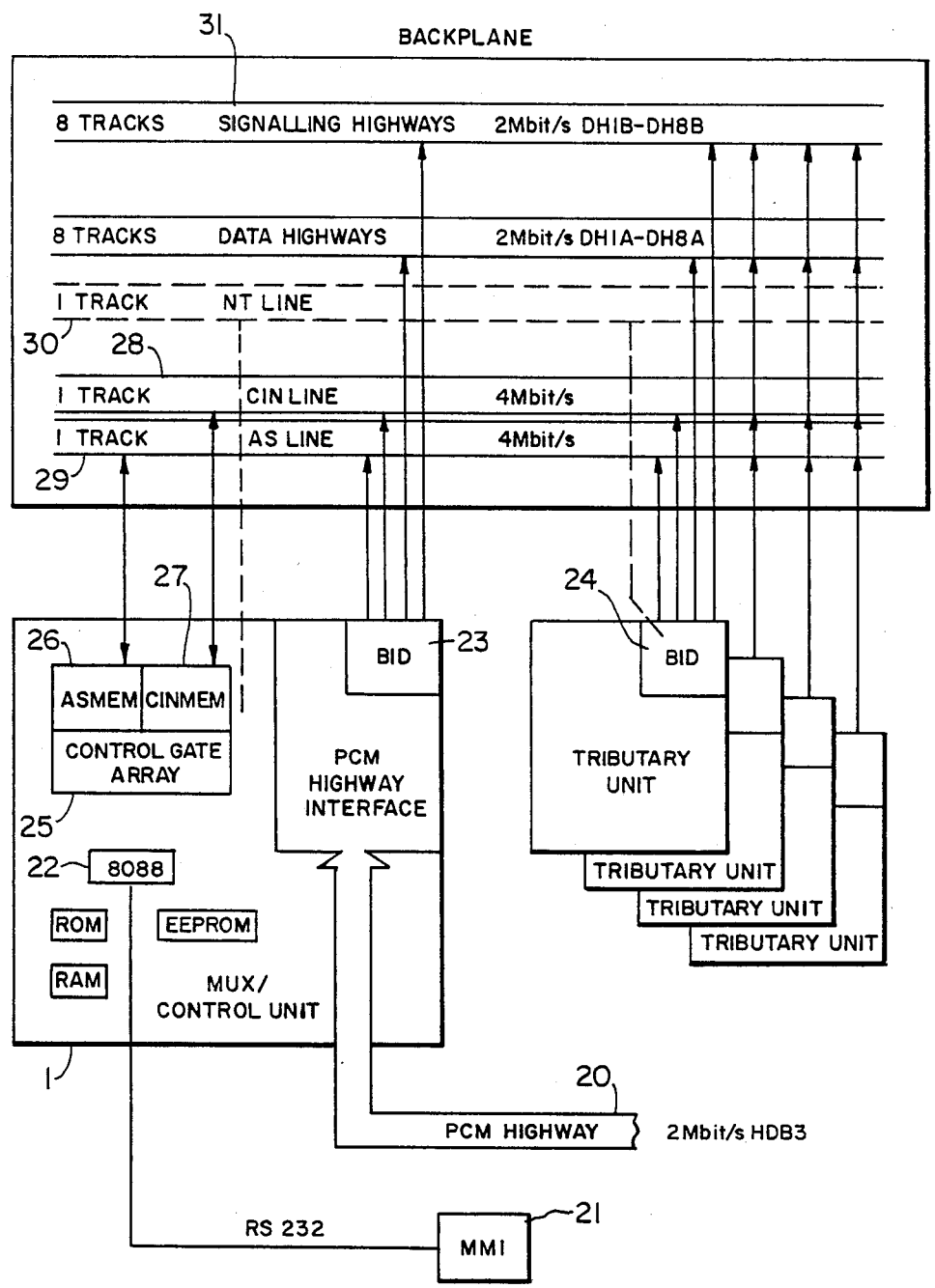
FIG. 2 is a somewhat more detailed representation of the system of FIG. 1.
Figure 3:
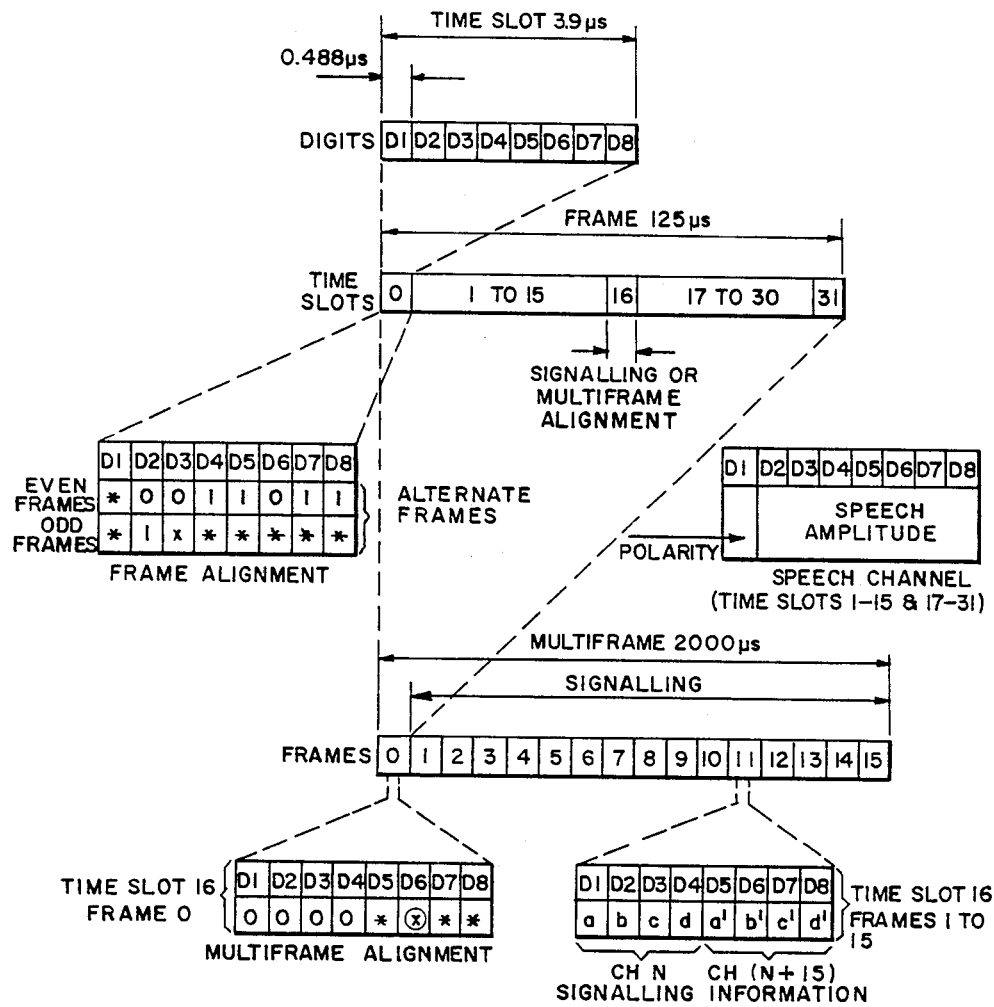
FIG. 3 shows the frame structure used in the system.

We now discuss the control unit 1 in more detail, with reference to the simplified block diagram of FIG. 2. FIG. 3, which shows the frame structure used, will also be referred to.

This control unit has the following major functions:

(a) It supports a 2.048 Mbit/sec port, from a PCM highway 20, FIG. 2, which uses HDB3 protocol, for both-way distribution of data, with HDB3 decoding and encoding, and frame and multi-frame removal and insertion. Connection of this highway is via a socket on the front edge of the unit, and may be 75 ohm coaxial or 120 ohm balanced pair. In some cases the control unit may support two or more such high bit rate trunks.

(b) It synchronises the system from a pair of 12.288 MHz crystal oscillators used as the master clock source. These are slaved to a reference clock signal extracted from the PCM data, an external clock source, or from a designated tributary unit (see below).

(c) It receives and processes fault information, and generates fault alarms and fault status reports from all units. Fault priorities and error rate thresholds can be changed under control of an MMI (Man-Machine Interface) 21, connected as shown to a microprocessor 22, via an RS232 link.

(d) It interprets and executes commands from a hand-held terminal or network management keyboard, to configure the tributary unit configurations, adjust audio input and output gains, set fault priorities, and make reports on demand.

The control unit includes the microprocessor 22, in this case an Intel 8088, which has a core program, and tributary-specific programmes, which programmes are in ROM, RAM and EEPROM. The core program includes a control executive with interrupt routines (for "house-keeping" functions, inter alia) and drivers, together with control programmes and service routines of a non-specific nature. The tributary-specific programs include a series of modules, each specific to one type of tributary unit - this may include several varieties of the same unit type. The program includes a "card-type" record for each tributary unit it can control. The software will be discussed in more detail later.

All units - including the tributary units - are connected to the highways formed by the printed circuit tracks on the backplane via bus interface devices, BIDs, such as 23, 24. As will be seen later each BID is part of a bus access unit (BAU), and some BAUs may have more than one BID. The highways on the backplane will be discussed in more detail later. The control unit has a control gate array 25 with RAM buffers 26, 27 for the transmission and reception of 64 byte (two per time slot) messages to and from the tributary units via 4 Mbit/sec BIDs associated with the buffers. These use the CIN (Control Input) line 28 and the AS (Alarm Status) line 29. Outgoing messages are transmitted from the control unit over the Control input bus line 28 and incoming messages are received at the control unit over the alarm and status line 29.

In the messages referred to above the first two bytes at time slot 0 (TS0) define the unit address and message type code respectively, whereafter time slots 1 to 31 contain the messages. The unit address includes the BID number plus the shelf slot (in the mechanical sense) number. Messages may contain configuration requests, alarm status, alarm priorities, executive action requests, and parameter modification requests.

Some "in-shelf" communication between the control unit and specific tributary units can take place over the network telemetry bus NT on the backplane, at 4 kbit/sec. This bus line is shown dashed at 30, FIG. 2. As will be seen later some of the highways may be used for inter-tributary unit communications.

The control unit has a 4 MHz master clock output, derived as indicated above, which can be synchronised to any tributary unit via the backplane tributary sync. line, which is one of the signalling highways 31, or the 2 MHz clock recovered from the received data on the port connected to the highway 20, or to an external clock source. Synchronising clock signals are then sent to all units as 4 MHz clock on two bus lines, and as frame sync. on another bus line.

The frame structure used is shown in FIG. 3, most of which is believed to be self-explanatory. Note however, that time slot 16 is used both for signalling and for multiframe alignment. Normal frame alignment is catered for in time slot 0, with different bit patterns for odd and even frames. Other points to note are the use of certain bits for alarm indications, and the fact that the spare bits can be used for data channels.

As is usual in PCM systems, some of the signalling and control functions which use time slot 0 (TS0) or time slot 16 (TS16) are multi-frame in nature. Thus TS0 is used for frame alignment in odd-numbered frames and for other signalling functions in even-numbered frames. There is also a 16 frame multi-frame organization, with TS16, frame 0, used for multi-frame alignment, and TS16 for the other frames used for signalling information. This will be discussed in more detail later when we consider the signalling operations.

Figure 4:
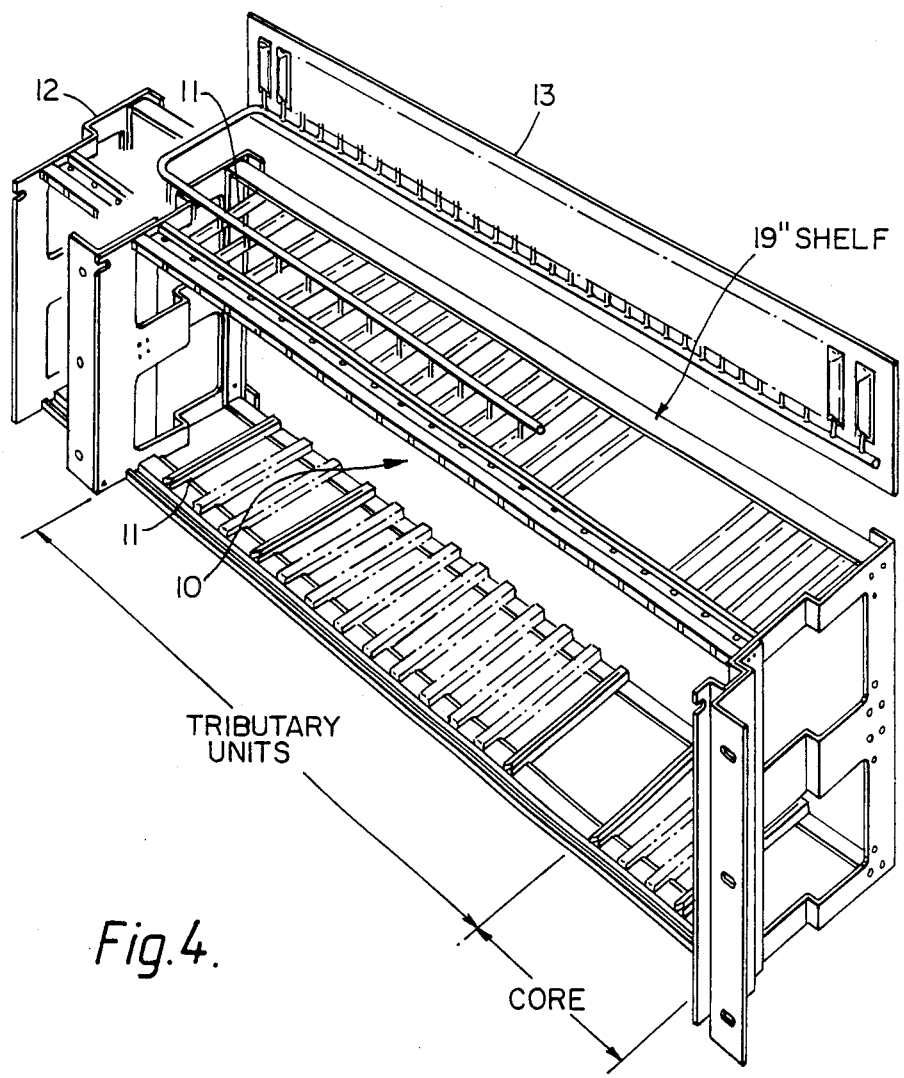
FIG. 4 is a perspective view illustrative of the mechanical aspects of equipment embodying the invention.

The bus structure is a multi-line printed circuit board arrangement which forms a backplane 10, see FIG. 4, of an equipment shelf containing equipment such as that shown in FIGS. 1 and 2. The shelf shown serves one core facility unit such as 1 (with or without a separate unit 2) FIG. 1, and a number of tributary units such as 3, 4, 5, FIG. 1. All of these units, which are printed circuit cards, are fitted into guides such as 11 in the upper and lower portions of the rack. Such a guide pair is referred to as a slot for receiving a card. Each such card has a multi-way connector at its inner end which is received by a corresponding connector (not shown) on the inside of the backplane 10. The connectors on the backplane 10 are set at right angles to the printed circuit lines on that backplane.

The bus highways, which are printed circuit tracks on the backplane 10, extend the length of the backplane, and interconnect the cards for data, signalling, synchronization, power, etc., as will be seen later. These cards are plugged into the connectors mentioned above, which are at right angles to the tracks. The bus structure requirements are relatively simple since great use is made in the system of single channel codecs, so that multiplexing and demultiplexing in the present equipment is fully digital. As already indicated, any tributary unit can make use of one or more 64 Kb/sec. time slots. The corresponding allocation of slots on the busses on the backplane 10 is controlled from the multiplex and control card 1 of the core facility (FIG. 1), where the current allocations are stored in a non-volatile memory. A tributary unit would be allocated two or more slots to provide a multi-slot service or to enable it to serve a number of users. The time slot allocations are conveyed via a set of address lines which form part of the bus structure.

As usual in such TDM systems, time slot 16 can be used for channel associated signalling, or as a normal 64 Kb/sec. bearer.

The system was originally designed, as mentioned above, with the British Telecom TEP1E shelf in mind, in which case the rack has an extension at its left hand end as shown at 12. It can also be used with a simpler 19" shelf, as shown, in which case the backplane is somewhat shorter.

The main mechanical feature is that the bus structure which interconnects the control unit (core facility) and the tributary units is a single printed circuit board with a number of parallel circuit lines. The board carries socket connectors at right angles to these lines to receive plug connectors on the inner end of the cards (not shown in FIG. 4). An additional backplane 13 can also be provided to give access to the rear of the shelf if this is needed. This backplane when provided is mounted behind and parallel to the bus structure's printed circuit card, and provides facilities for making connection to the bus structure.

The printed circuit cards which carry the various portions of the control unit (where there are more than one portion) and the tributary units have connections to the "outside world" made at their outer ends. These connections, in the cases of the tributary units, are the connections to the trunks and to the various subscribers and the like. The outer ends of these cards can also be provided with means of access to the circuitry on those cards for test purposes.

As already indicated, the interfaces provided by the tributary units can include a number of options, e.g. speech only, speech in combination with signalling, data. Further a tributary unit can have a number of such options, programmed from a non-volatile RAM in the core facilities' unit. Related equipment for use with the tributary units includes network termination units, plus driving termination units to give remote access to, for instance, subscribers' equipment.

The equipments described herein are compatible with the general alarm systems used, and all of the units feed information as to individual alarms to the bus structure as eight bit words. This enables the multiplex and control portion 1 of the core facilities to process the alarm information for sending to a separate multiplex arrangement.

The active lines of the bus structure in one implementation are as follows:
(a) 4 MHz clock (CK), which carries a 4096 KHz square wave (CK+ and CK−) forming the main system clock. The tracks which convey these signals are terminated with their characteristic impedances to minimise ringing and reflection.
(b) Frame sync. (FS), which is a 224 ns pulse, repeated at the frame rate of 8 KHz. The trailing edge of the pulse coincides (nominally) with the end of the frame, i.e. the end of time slot 31 and the beginning of time slot 0.

(c) Network telemetry (NT), used for network management, with message destinations detectable from the messages sent. This is an "open collector", active low, bidirectional line, and conveys 4 Kbit/sec data. The actual destination of a message is defined by its content.

(d) Tributary Sync. (TS), is a 2048 KHz square wave provided by a designated bus access unit (BAU) to phase lock the master clock.

(e) Control Input (CIN), is a 4096 Kb/sec. serial control line from the core facilities unit 1-2. A message includes a start bit, a seven-bit physical address, a message type bit and up to 4096 bits for the message. Messages are sent intermittently on this line, as necessitated by the operations of the core facilities, etc., and the line is pulled "high" when no message is present.

(f) Alarm and Supervisory (AS) line conveys 4096 Kb/sec. serial messages from a BAU in response to an interrogation request from the control unit 1-2. The first 128 bits of such a message are used for contention resolution (in a manner similar to that function in a local area network), the next two bytes identify the position and type of the card, and the next 368 bits are for the message.

(g) Data Highways (DH1-16) convey 2048 Kb/sec. information, and are all frame synchronised with FS, and have 32 slots of eight bits each. The uses of these highways are:

(i) DH1A conveys 32×64 kb/sec. signals received at the main 2 Mbit/sec. port in the core facilities unit (ii) DH1B conveys channel-associated signalling received with the data on DH1A (iii) DH2A and DH2B convey data and signalling from BAU's to be sent from the main 2 Mbit/sec. port (iv) DH3A and DH3B, and DH4A and DH4B convey data between BAU's, the A and B highways for 64 Kb/sec. data and channel associated signalling respectively.

Other highways which may be needed in more complex systems are DH5-DH8, both A and B, which are similar to DH1-DH4, A and B, and DH9-DH16 which do not provide for channel-associated signalling.

These data highways are tristate highways used to communicate information between one plug-in unit and another plug-in unit. They are all frame synchronous with FS and all have 32 time slots. The term "data highway" is generic, and does not mean that it supports only data in a traffic sense. Each data highway can support 2048 or 4096 Kb/sec. data at 8 or 16 bits per time slot respectively.

We now consider message formats on the various highways described above.

A CIN message is composed of a start bit, which is always set to zero to indicate the start of a valid message, physical location bits AD0-AD6, message type bits MT0-MT7, and the message.

The bits AD0-AD6 identify the location of the BID, and thus the appropriate access unit for which the message is intended, with bits AD2-AD6 identifying the position of the tributary unit on the shelf and AD0 and AD1 identifying the bus access unit on the tributary unit card. Note that a tributary unit card can have more than one such access unit.

The bits MT0-MT7 indicate the type of data in the remainder of the message, and the information to be returned to the control unit via the AS line.

An AS message includes four main elements, contention resolution, location (PA0-PA6), readback byte (RB0-RB7), and the message.

First we consider contention resolution. The AS line is driven from open collector circuits, and is normally high when no message is being carried. Normally an AS message is generated at a tributary in response to a CIN message, and occurs in the frame immediately after that CIN message. Thus only one AS message is generated in one frame. However, certain alarms require fast "executive" responses from the controller, and for these an AS message is generated spontaneously. A BID which generates such a message places a zero in the bit position, numbered from the beginning of the frame, which corresponds to its location number. This is recognised by the other units, whose AS messages are then suppressed. This resolves contention, since if there are simultaneous requests for "executive AS", priority is assigned according to location on the shelf.

The next byte, PA0-PA6, contains location information derived from fixed shelf and board wiring, corresponding to the address field of the CIN message.

The readback byte, RB0-RB7, identifies the type of unit. It may be extended to two or three bytes by using the last bit of each readback byte to indicate the presence or absence of another contiguous readback byte. This last bit is 1 to indicate that another readback byte follows, and 0 when no such byte follows. RB0 is sent first.

The remaining 368 bits, or less if there are extended readback bytes, are available for the message which may contain status or alarm information as requested by the CIN message.

We now consider the data highways DH1-DH16 (where all 16 are used). These are "ganged" together in sets of four, e.g. DH1A, DH1B, DH2A and DH2B; each such set consists of a pair of unidirectional data lines (DH1A, DH2A) providing a full duplex path for data or PCM voice, and a similar pair (DH1B, DH2B) of unidirectional signalling lines. The signalling may be channel associated, or specialised signalling/management functions, or packetised data.

Not all highways terminate at the control unit, and those which do not can be used by tributary units for inter-tributary transfer of data.

Figure 5:
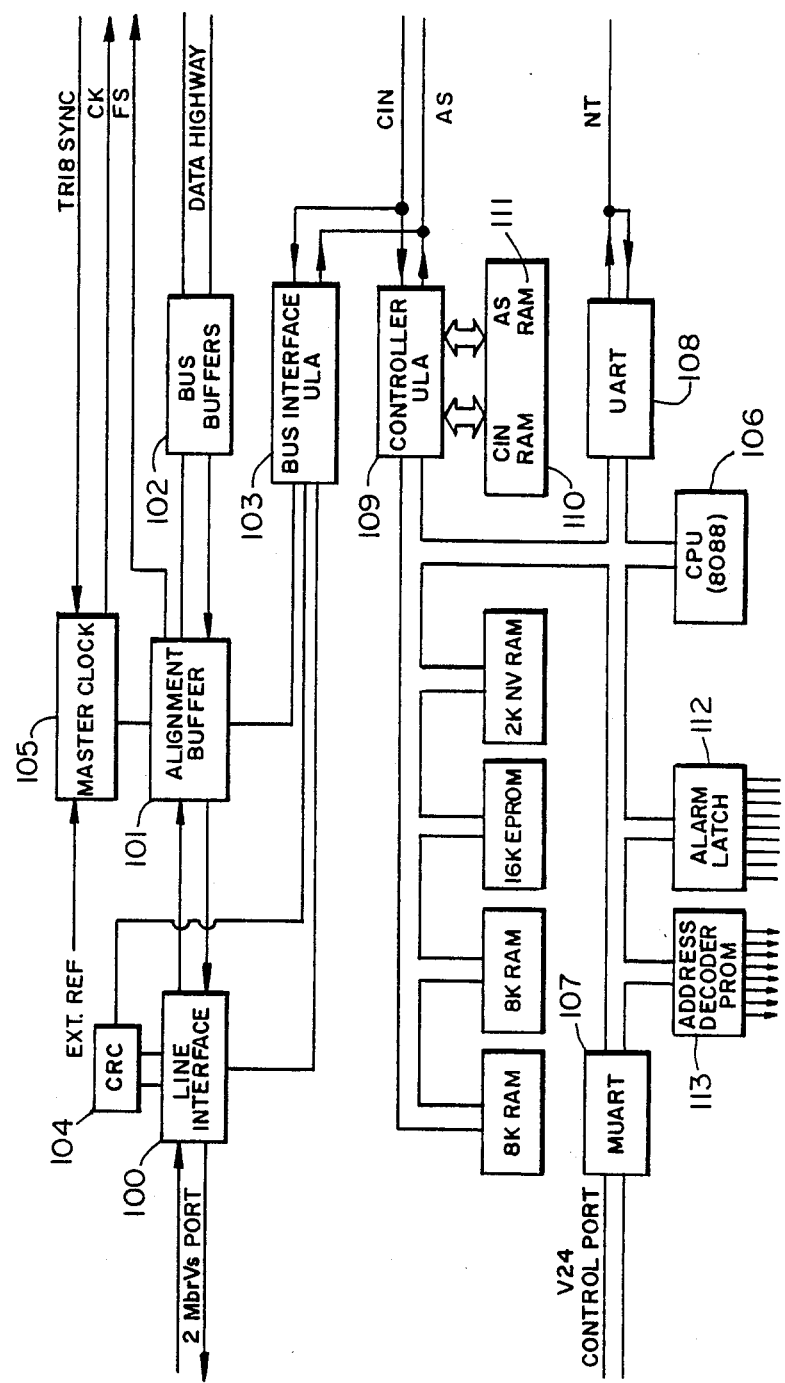
FIG. 5 is a block diagram of the controller 1 (FIG. 1).

The mux/control portion of the core facilities unit 1, see FIG. 5, provides the main 2 Mbit/sec. port with the interface 100, bit and frame alignment arrangements 101, buffering and processing (102, 103) of maintenance signals, a cyclic redundancy check unit 104 (if needed), a master clock 105 which can be synchronised to a number of references, and the controller 106 which has RAM, ROM, and processing capability, in this case in INTEL 8088 microcomputer. It controls and supervises the system.

The 2 Mbit/sec. interface 100 referred to above has the trunk connected to it at the front of the card. On the receiving side it includes timing recovery HDB3, line code decoding, and frame and multi-frame decomposition. On the transmitting side it has the complementary functions of frame and multi-frame generation and HDB3 encoding. The transmit frame generator must be synchronizable to the system clock or to the recovered clock. Detectors are needed for various fault conditions, and generators for various signals. The interface also provides the CRC (error check) bits, if needed.

Any one of four spare bits selected from the spare bits, see FIG. 3, can be used as a 4 Kb/sec. network management channel.

The controller has the following functions:
(a) store the operating parameters of the BIDs of the BAU's,
(b) transfer the operating parameters of the BAU's, when necessary as CIN messages over the CIN line,
(c) receive and interpret alarm and supervisory (AS) response from BAU's over the AS line,
(d) communicate with user ports at the tributary units to set operating parameters and implement alarm diagnostic procedures,
(e) communicate with a network management unit, which serves a number of systems such as described herein via the 4 Kb/sec. channel or a user port,
(f) provide a local alarm interface,
(g) execute application dependent executive action as called for by the condition of the system.

The main 2048 kb/sec. port is transformer-coupled to a bipolar interface circuit implemented as a semi-custom analogue device which in turn is driven from a CMOS line interface ULA. This performs the functions of HDB3 coding and decoding, frame generation and alignment, and generation and extraction of the usual alarm and supervisory information as per CCITT recommendation G732. Provision is made for a Cyclic Redundancy Check ULA 104 to be added which implements the CCITT G704 recommendation. This enables improved monitoring of low error rates, but is only used if the user of the system makes CRC standard on all 2048 kbit/sec switch ports. The alignment buffer 101 performs the function of synchronizing the transmit and receive streams on the backplane. In plesiochronous working it can perform controlled slips and it can also perform a time slot interchange (TSI) function under the control of the bus interface device 103.

The master oscillator in the clock 105 can be phase-locked to the incoming signal, an external reference, or a synchronizing signal via the bus from a nominated source, and emits the CK and AS outputs.

The bus interface device 103 performs the same role for the 2048 kbit/sec. interface as it does for any other unit of the equipment, namely that of interfacing with the controller via the CIN and AS lines. It generates strobes and TSI according to instructions from the controller 109. It also assembles alarm and supervisory (AS) messages relevant to the 2048 kbit/sec. port.

The controller 109 uses an Intel 8088 microprocessor 106 running at 4 MHz together with RAM, EPROM and NVRAM to perform the following functions:
(a) Storage and update of system status information in NVRAM (Non-Volatile RAM).
(b) Compilation and transfer of status information and time slot allocations to dependent units via the CIN serial control line on the backplane bus. Note that controller 109 has its CIN RAM 110.
(c) Reception and interpretation of alarm and status reports from dependent units via the serial AS line. Note the AS RAM 111 associated with the controller 109.
(d) Interface to terminal, network manager or operations centre via serial control port.
(e) Implementation of an alternative channel using a spare bit of TSO for remote provisioning and mintoring.
(f) Support of a parallel alarm bus for traditional local station alarms.

The microprocessor 106 is concerned with higher level functions only, the low level interface functions being generated in hardware. Address decoding is performed by a 2 K×8 bipolar PROM 113 which provides memory mapping for the UARTs, the static RAM, EPROM, NVRAM, controller gate array, alarm I/O latch and 'out of range' signal.

Both the CIN and AS lines run at 4096 kbit/s synchronous with the system clock and carry messages whose information fields are defined by the system frame structure.

The control port connected to a MUART 107 provides serial, asynchronous access to the multiplexer from a terminal. This can be used by maintenance personnel to interrogate the alarm system and carry out diagnostic operations. All status indications are provided via this port except 'power fail' and 'processor fail'; which use LEDs.

The Network Telemetry bus line NT, FIG. 2, is connected to a UART 108, and it extends the equivalent 4 kbit/s data link to other network ports (e.g. when used in drop and insert mode).

The alarm I/O latch 122 conveys alarm information to the end of shelf display unit which also houses the "receiving attention" switch. This latch 112 can also be used to take in alarm signals from outside the multiplexer, such as from an adjacent multiplexer.

The controller (109) software is classified into six application tasks (in order of priority.
(i) 'Fault handler task' handles fault recovery.
(ii) 'MMI transmit task' deals with messages via the control port.
(iii) 'Link transmit task' does the same for the TSO link.
(iv) 'The receive task' deals with received messages from both sources and has access to data in the parameter store.
(v) 'Menu task' is only used when a hand-held terminal is connected; it displays text and interprets key presses.
(vi) 'Alarm handler task' controls the alarm interface.

The executive scans the tasks looking for an Active Flag in order to determine which task is to be executed, the order being determined by the priority.

A system background task is active when no other tasks are active. This task carries out self test functions (EPROM check, RAM check etc.). It also maintains a list of current alarms by polling each tributary in turn, updating parameters in the process. The contents of the NVRAM are compared byte by byte with its RAM image and any changes queued for writing.

FIGS. 6 to 10 show how arrangements such as described above, referred to by the use of the trade mark as PDMX, i.e. programmable digital multiplexers are used in practice.

FIG. 6 shows a standard drop/insert arrangement using one PDMX equipment connected between two 2 Mb/sec. lines.

Figure 7:
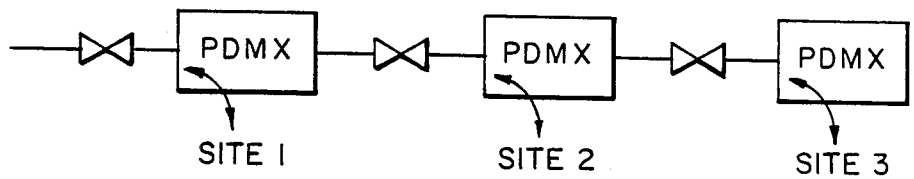

FIG. 7 shows three PDMX equipments connected in effect in series in a distributed multiplex arrangement.

Figure 8:
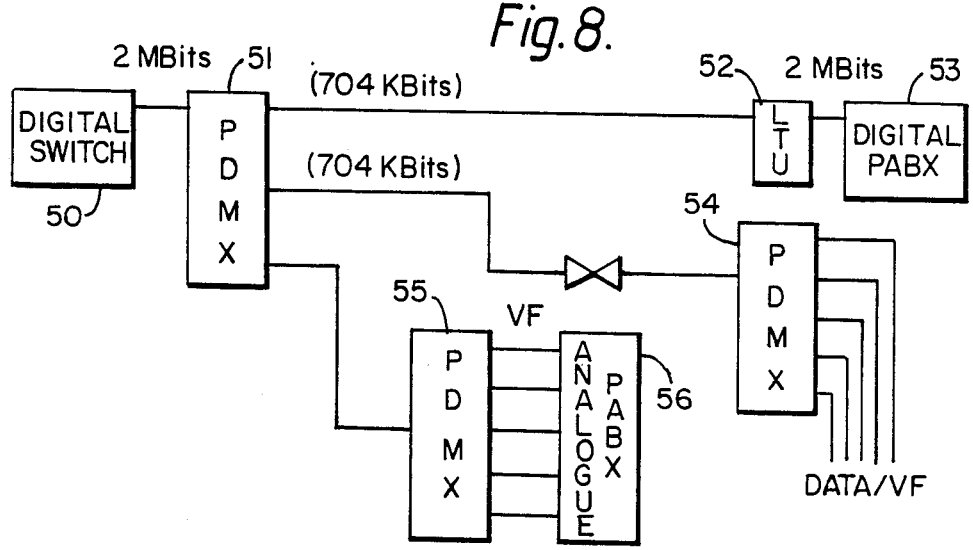

FIG. 8 shows a so-called ten channel distribution network. Here we have a digital switch 50, i.e. a digital exchange, connected via a 2 Mb/sec. trunk to a first PDMX equipment 51. This gives access via a 704 Kb/sec. line to a line termination unit 52, which is connected via another 2 Mb/sec. line to a digital PABX 53. Another 704 Kb/sec. line gives the PDMX equipment 51 access to another PDMX equipment 54, serving data and VF outlets. Finally another 704 Kb/sec. line gives access to a PDMX equipment 55 which provides access to an analogue PABX 56.

Figure 9:
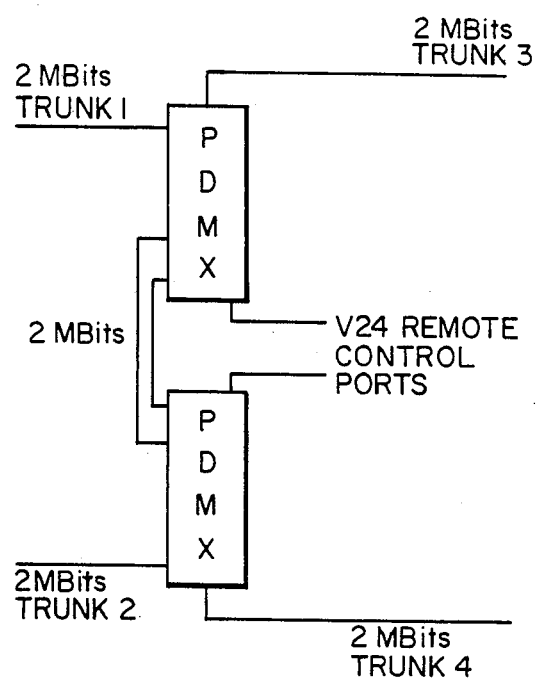

FIG. 9 shows a digital cross-connect arrangement in which there are two PDMX equipments connected as shown.

Figure 10:
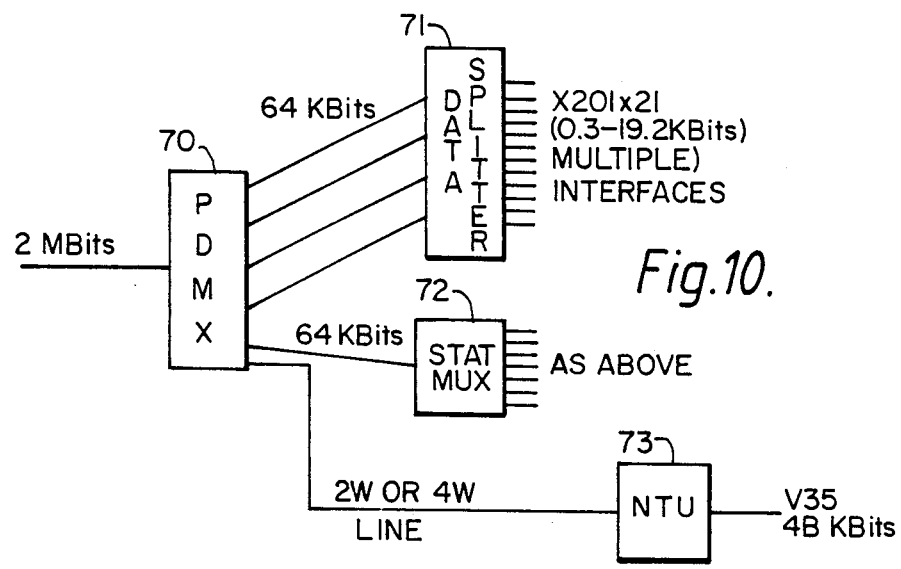

FIG. 10 is a data expansion and remote access arrangement in which there is a group of 64 Kb/sec. lines from a PDMX equipment 70 to a splitter arrangement 71, giving access to a number of interfaces. There is also a statistical multiplexer 72 coupled by another 64 Kb/sec. line to the PDMX equipment 70, the multiplexer 72 giving access to various interfaces. Finally a two or four wire line from the PDMX equipment 70 gives access to a network terminating unit 73 whose "other side" is a V35 48 Kb/sec. line.

Naturally PDMX equipments as described herein have many other applications.

Note also that the equipments according to the present invention are designated in the block diagrams by PDMX, which is a Registered Trade Mark of STC PLC, the assignees of the present applicants.

We now consider the signalling operations briefly. Signalling is received via the high bit rate trunk either as channel-associated signalling, or in common channel manner using, for instance time slot sixteen (TS16). In either case the signalling processing, which may use an additional card to the controller, extracts the signalling information under control of the system's clock. This information is then converted into a format suitable for use within the equipment, and is used to control such operations as the allocations of time slots to the intelligence to be sent to the tributary units appropriate to the information's intended destination.

Thus the controller "knows" from the contents of its memory, which low bit rate highways (most of which extend to subscribers) are to be used for incoming calls for particular destinations. It then selects an available time slot for use within the equipment and allocates that time slot to a call. Thus the controller is connected via one of the data highways on the bus structure to the tributary unit for the destination appropriate to the call being handled. As already indicated, since the details as to the locations of these destinations and their tributary units is stored in memory, there is great flexibility in respect of physical location of tributary units To extend a call to a particular destination, the controller and signalling equipment together select an address for that tributary unit and the appropriate highway thereon. This address is then sent out over signalling highways on the bus structure and thus "offered" to all tributary units. Each of these units has an interface device (BID) which responds to its own address. Hence the "set-up" message including that address is responded to by the appropriate tributary unit's BID, and the portion thereof which identifies the lower bit rate highway on that tributary unit enables that highway. These responses in effect cause the portion of the bit stream on the 2048 kbit/s trunk for that call to be routed to the required lower bit-rate highway.

For a call originated on a lower bit rate highway, a tributary unit signals to the controller that this call exists. This causes the controller to select a free time slot on the trunk, whereafter the connection is set up in a somewhat similar manner to that used for the trunk-originated connection.

Note that the signalling arrangements include provisions for providing busy and other signals as appropriate. Further, as already mentioned, the functions of the units 1 and 2 may in some cases be combined in one unit.

Figure 11:
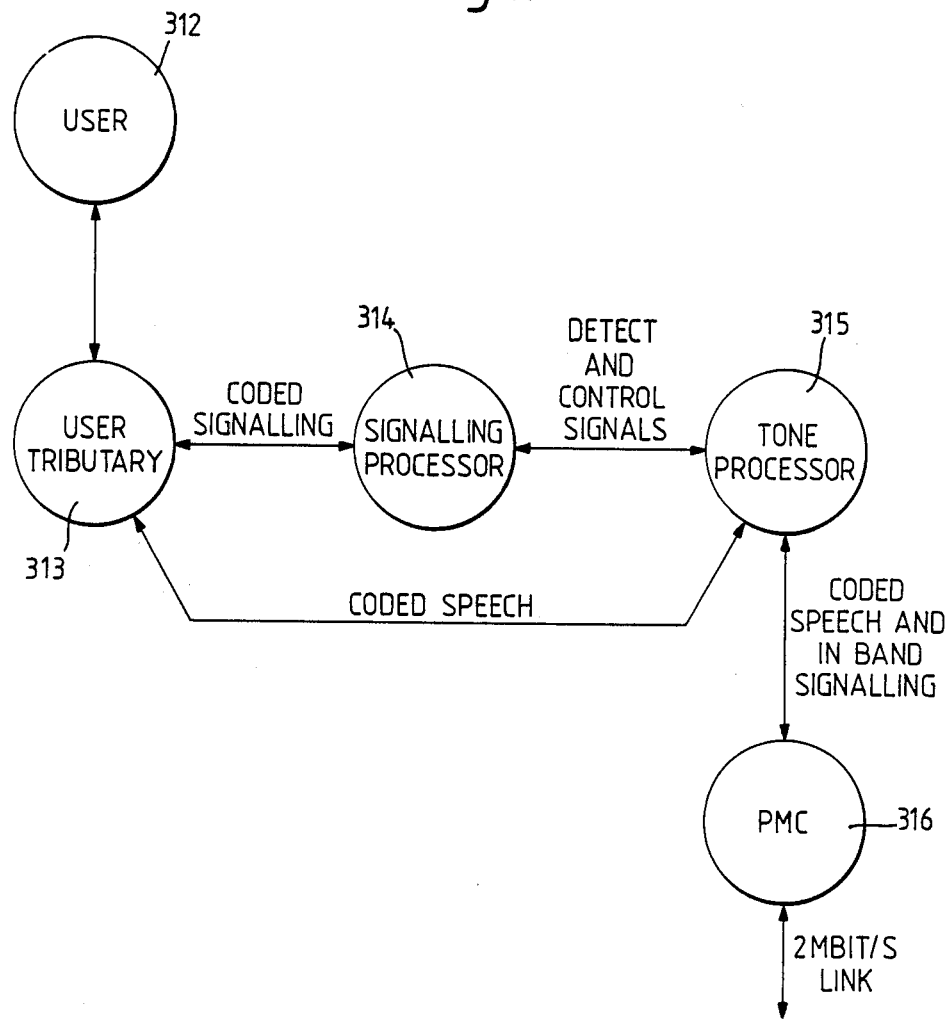
FIG. 11 represents schematically the function of the tone processor card of the equipment shown in FIG. 1, together with its relations with the signalling processor card.

The tone processor co-operates both with the signalling processor and the mux/control card in its processing functions. As seen in FIG. 11, it enables channels and their associated signalling to be routed through intermediate switches between PDMX equipments that cannot handle TS16 Channel Associated Signalling. It comprises one circuit which serves up to 30 channels with the functions discussed hereinbelow.

The circuit is an intermediate processor for A-law encoded speech signals and operates in conjunction with a signalling processor 2. The circuit converts the signalling to and from a signalling processor for the signalling systems used by various tributaries e.g. Magneto, Earth calling, Loop calling and E & M. The signalling protocols are determined by the signalling processor.

The tone processor uses a single-frequency tone and digital signal processing circuit with time-shared hardware for the detection and generation of coded in-band signals for up to 30 channels. It can pass forward and backward signals simultaneously. As will be seen, it functions in close cooperation with the signalling processor.

The hardware can support a range of frequencies and levels selectable on a per-unit basis by messages from the mux controller 1, FIG. 1.

In the transmit direction the circuit receives coded speech signals from a user tributary and associated signalling from a signalling processor. These are sent to the mux controller. The signalling is transformed to in-band coded signals (FIG. 11).

In the receive direction the circuit receives coded speech signals with in-band coded signalling from the mux controller. The coded speech signals are sent to the user tributary and the associated coded signalling is transformed and sent to the signalling processor.

Thus, see FIG. 11, we see the user 312 connected in both-way manner to a user tributary 313. This is connected, with coded signalling to the signalling processor 314 (2, FIG. 1), which cooperates with the tone processor 315 (6, FIG. 1), and the control unit 316 (1, FIG. 1). The basis of the operations is that the tone processor, when suitably stimulated, generates the tone signals needed and supplies them to the bus structure at the appropriate time slots. It also responds to received tones and detects them.

The tone processor 315 is stimulated to generate tones by the signalling processor 314 and/or the control unit 316, and it supplies the results of its detection operation to those two units. In view of the used in-band signalling in the system, coded speech is routed through the tone processor 315.

Hence these processors respond to data (using that word in its broad sense) received from the bus structure, and apply the results of its operations to the bus structure.

Thus when a tone arrives, it passes from the user tributary 313 to the bus structure from which it is detected by the tone processor 315. This, via the bus structure passes the results of the detection as required to the mux controller 316 or the signalling processor 314, or both. Similarly, the tone processor 315 receives instructions from either the signalling processor 314 or the mux controller 316 or both to cause it to generate suitable tones.

The active lines of the bus structure include lines for PCM coded speech, signalling between the control unit 1 and the other units, clocks and network telemetry. This last-named uses a special line on the bus structure, the NT line, which deals with network management messages. The messages sent over this bus have their destinations detectable from the messages sent.

The operations of the tone processor occur under the control of software stored therein. For this reason, we do not give much detail in respect of the hardware aspects of this device. The tone processor is in fact a finite state machine, since it can exist in a number of defined states, in some of which it is receiving stimuli from the "outside world", and in some of which it transmits to the "outside world". It switches between its various states in response to the various stimuli it receives. For instance, when the tone processor is advised that a telephone connection has been set up to a wanted subscriber's line, it checks from the information in its memory what sort of line it is. As a result it determines, under software control, the nature of the ringing tone to be sent to the caller and also the signal to be sent to the called line. When the called subscriber replies, the signal to that effect is sent back via one of the tributary cards and the appropriate highway on the bus structure to the tone processor card where it causes the ringing signal and current to be terminated.

In view of the considerable background of knowledge of "software engineering" available to one skilled in the art it is not felt that more detailed information on the tone processor is needed.

We can now consider message formats on the various highways, since this is a highly significant part of the general signalling operations.

A message on the control line CIN, which is one of the tracks of the bus structure shown in FIG. 1, is composed of a start bit, set to zero to indicate the start of a valid message, physical location bits AD0-AD6 identifying the position of the wanted tributary unit on the shelf and also the bus access unit on the tributary unit card. These are followed by the bits MT0-MT7 which indicate the type of data in the remainder of the message, and the nature of the information to be returned to the control unit via the AS line.

An AS message, sent in the reverse direction on the AS line, includes four main elements, contention resolution, location (PA0-PA6), readback byte (RB0-RB7), and the message.

For contention resolution, the AS line is normally high when no message is being carried. Normally an AS message is generated at a tributary in response to a CIN message. Thus only one AS message is generated in one frame. However, certain alarms require fast "executive" responses from the controller, and for these an AS message is generated spontaneously. A unit which generates such a message places a zero in the bit position corresponding to its location number. This is recognised by the other units, whose AS messages are then suppressed, which resolves contention, since if there are simultaneous requests for "executive AS" priority is assigned according to location on the shelf.

The next byte, PA0-PA6, contains location information derived from fixed shelf and board wiring, corresponding to the address field of the CIN message.

The readback byte, RB0-RB7, identifies the type of unit. It may be extended to two or three bytes by using the last bit of each readback byte to indicate the presence or absence of another contiguous readback byte. This last bit is 1 to indicate that another readback byte follows, and 0 when no such byte follows. RB0 is sent first.

The remaining 368 bits, or less if there are extended readback bytes, are available for the message which may contain status or alarm information as requested by the CIN message.

We now consider the signalling processing operations either as channel-associated signalling, or in common channel manner using, for instance, time slot sixteen (TS16). In either case the signalling processing, which uses the card 2, unit 314 in FIG. 11, extracts the signalling information under control of the system's clock. It implements bidirectional, state dependent, conversions between channel associated PCM signalling codes and various signalling interface units. A single unit can process all 30 channels. Thus the signalling processor is also a finite state machine.

The card 2 has in its software memory a number of different conversion algorithms any one of which can be assigned to any timeslot under the control of the Mux/Controller card.

As will be seen from the subsequent description, there are several important aspects of the signalling processor arrangement. These are:

(a) separation of the interface functions, such as loop, and earth calling functions from the logic-type functions. Both of these sets of functions are software programmable.

(b) the signalling processing functions are implemented in finite state machine manner. As mentioned above this also applies to the tone processor.

(c) the arrangement effectively implements software aid which can convert an SDL description of the signalling function into PROM (Programmable Read Only Memory) hardware directly (with minimal human intervention) for use in the state machine.

SDL is a specification description language, and is a formal specification technique recommended by CCITT for specifying signalling systems in telecommunications. It is a formalised version of a flow diagram.

The signalling processor card performs the following functions:

a. Buffers the incoming PCM signalling data, A, B, C and D bits for 32 timeslots. This uses the eight bit word at TS16, which provides two blocks each of four bits A, B, C, D. In some cases only one such block is used.

b. Buffers the incoming line signalling data (16 bits/channel for 32 channels.

c. Uses the incoming PCM and line signalling data to generate outgoing PCM and line signalling data according to a specified algorithm. A number of algorithms is available with the signalling processor's memory, any one of which can be assigned to any timeslot under control of the Mux/Controller card, and of incoming signalling information.

The signalling processor performs between 1 and 4 conversions on each timeslot every 2 ms., under software control.

The signalling in TS16 uses the eight bits in some at least of the successive occurrences of TS16 to provide two sets of four signalling bits, A, B, C, D and A', B', C', D'. In the present case only the first four of these bits are actually used.

Figure 12:
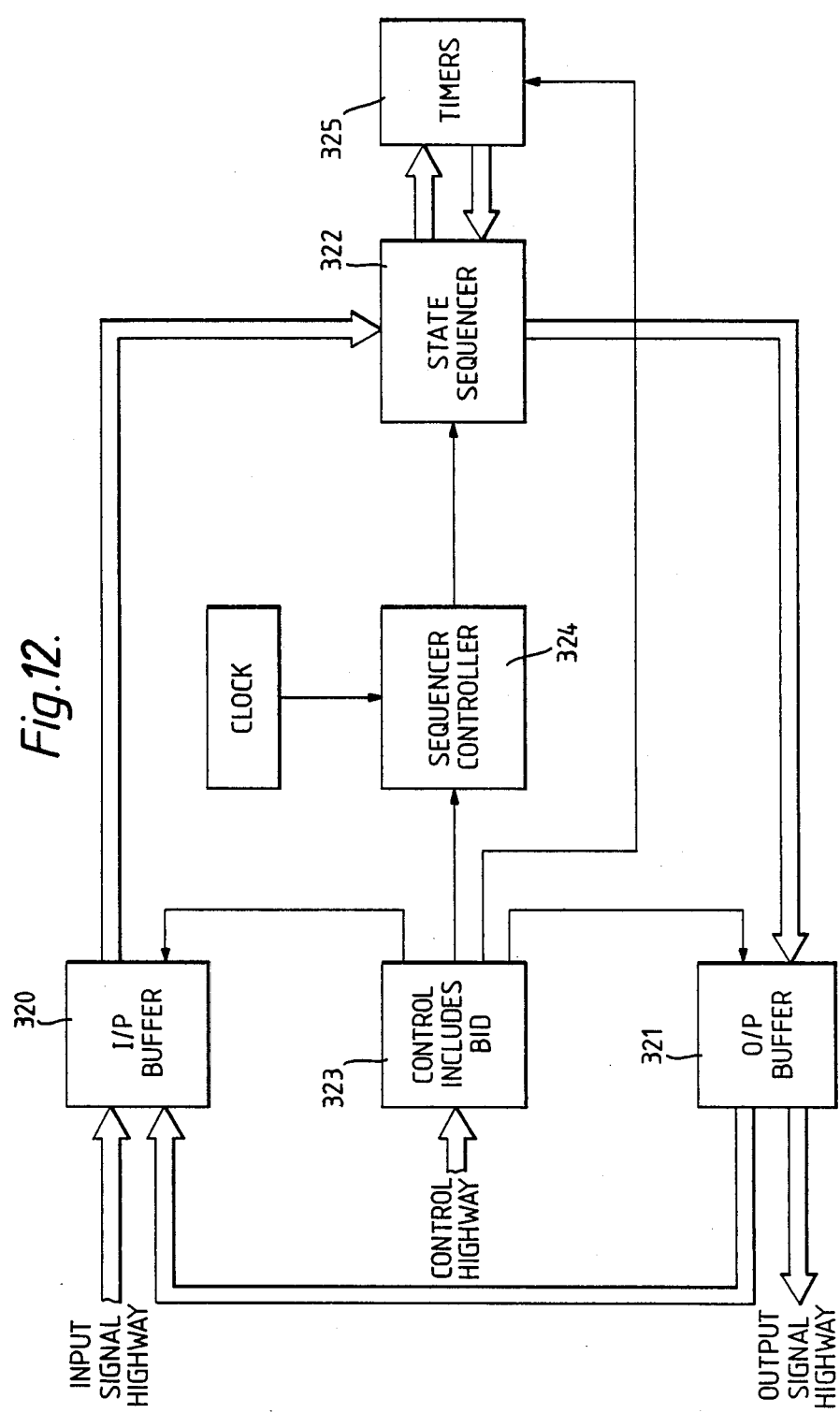
FIG. 12 is a schematic representation of the signalling processor of the equipment of FIG. 1.

Each of the functional blocks of the signalling processor card will be described separately, see FIG. 12.

The Input Buffer 320 connected to the input signal highway of the backplane includes multiplexer, shift register, latch and data selector sections. The input buffer takes data from one of three data highways on the backplane for both the PCM signalling data and the line signalling data. The choice of the signal highway to be used depends at least partly on the destination of the data to be outputted. Thus the control section determines which highway to use for the current timeslots by setting the appropriate 'HIGHWAY SELECT' line low. For any timeslot the PCM and line data must come from the same highway number. The data is then passed to serial-in/parallel out shift registers and deserialised.

The Output Buffer 321, connected to the output signal highway of the backplane, consists of buffer RAMS (4-bit wide for the PCM data and 16 bits wide for the line data), parallel-in/serial-out shift registers and output demultiplexers.

Data is loaded into the RAMs from the sequencer 322 during the middle of a backplane timeslot. The sequencer 322 uses a line 'IO/PROC' included in the multi-wire connection to the block 322 to determine whether the RAMs are being read (during bits IS and O of the 2 MHz data) or whether they are idle. The RAM address reflects the current timeslot being processed by the sequencer.

At the end of the outgoing timeslot period the RAM address changes from sequencer address to timeslot address +1 and the data is latched into the shift registers on the transition from timeslot (n) to timeslot (n+1) under supervision of the control section.

PCM data is shifted out at 2 Mbps and line signalling is shifted out at 4 Mbps. Since the PCM data uses 8-bit words and the line signalling uses 16-bit words, these words occur effectively in parallel. The data is shifted out to multiplexers in the buffer 321, which under control of the control section, output the data onto the appropriate data highway.

The Control section 323 consists of the bus-interface gate array, i.e. the BID (Bus Interface Device) circuitry, sequence address generator, output-RAM address generator and conversion-algorithm RAM (and associated control circuitry).

The Bus interface array determines what state table in the processor is followed for a particular timeslot. The state sequencer 322 under supervision of the sequencer controller 324 implements the state transitions within the parameters defined by the bus interface. The state tables contain stored information as to how the signalling processor should respond to the various line conditions.

The Bus interface will be discussed in greater detail later on.

The State Sequencer 322 takes data from the incoming line highways and incoming PCM highways via the buffer 320 and generates outgoing line data and outgoing PCM data which pass out via buffer 321. The sequencer controller 324 generates all the logic signals necessary to operate the sequencer.

The Timer Controller 325 is a 16-bit counter with decoding and a select multiplexer. The counter is clocked every 2 ms. and the decoding produces 5 outputs. This select multiplexer selects one of these signals based on a timer select field from within the sequencer and this selected signal determines how often each timer count is decremented.

Thus between them, the signalling processor and the Mux Controller are used to control such operations as the allocations of time slots to the intelligence to be sent to the tributary units appropriate to the information's intended destination. As already indicated, when tones are involved, the tone processor is also involved in these operations.

Thus the controller "knows" from the contents of its memory, which low bit rate highways (most of which extend to subscribers) are to be used for calls for particular destinations. It then selects an available time slot for use within the equipment and allocates that timeslot to a call. Thus the controller is connected via one of the data highways on the bus structure to the tributary unit for the destination appropriate to the call being handled. The details as to the locations of these destinations and their tributary units are stored in memory, so there is great flexibility in respect of physical location of tributary units.

To extend a call to a particular destination, the controller and signalling equipment together select an address for that tributary unit and the appropriate highway thereto. This address is then sent out over signalling highways on the bus structure and thus "offered" to all tributary units. Each of these units has one or two bus interface devices (BID), each of which responds to its own address. Hence the "set-up" message including that address is responded to by the appropriate tributary unit's BID, and the portion thereof which identifies the lower bit rate highway on that tributary unit enables that highway. These responses cause the portion of the bit stream on the 2048 kbit/s trunk for that call to be routed to the required lower bit-rate highway.

For a call originated on a lower bit-rate highway, a tributary unit signals to the controller that this call exists. This causes the controller to select a free timeslot on the trunk, whereafter the connection is set up in a somewhat similar manner to that used for the trunk-originated connection.

Note that the signalling arrangements include provisions for providing busy and other signals as appropriate.

The system software is installed in the Mux Controller 1, FIG. 1. It has a modular structure which closely reflects the functions supported. The interfaces between modules are well defined, and well documented high level languages are used for generating code.

Figure 13:
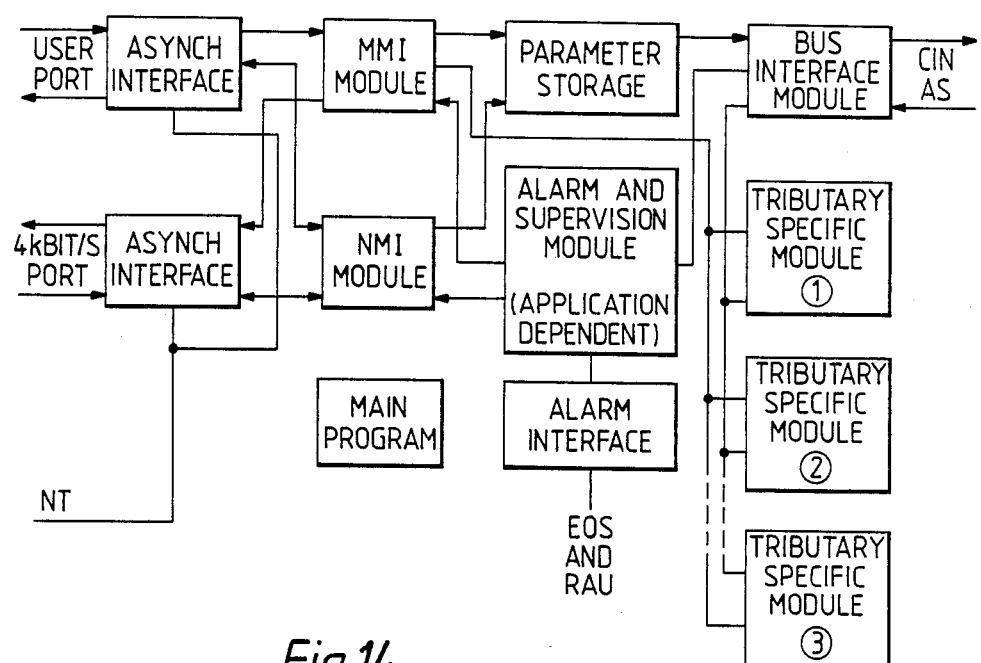
FIGS. 13 and 14 are schematic representations of software arrangements used in the equipment of FIG. 1.

The main functional blocks of the software are shown in FIG. 13, which illustrate the functionality.

The MMI module serves both the serial data link connected to the V24 port of the mux/control card and that connected to the 4 kbit/sec. channel formed by "spare" bits of the TDM/PCM highway. This module generates the display for a hand-held terminal when that is used to control system setting, and interprets the responses from the keyboard.

Interaction with the user uses programme menus with a hierarchial tree structure. The high level part is in the MMI module while lower parts are in tributary specific modules.

The network manager to be considered later interacts with the equipment in a more direct manner, asking for reports of specific memory contents and updating specific bytes of NVRAM. This it does via the NMI module. All the man machine interfaces required to effect any change of status are in the network manager.

The NMI module can thus recognise and interpret the messages from the network manager (NM) and when required generates suitably formatted responses to the NM controlling in each case the appropriate memory transactions.

The Alarm and Supervision Module inspects all received data and initiates alarm, supervisory or execute actions accordingly. As such, it has an application-dependent element. The system supports convention TEP1E alarm interfaces.

The Bus Interface Module is responsible for assembling CIN messages and interpreting AS messages.

The Tributary Specific Modules provide the procedures for updating tributary parameters, extracting tributary status reports from associated AS messages and interacting with MMI and NM1 to achieve these ends.

Figure 15:
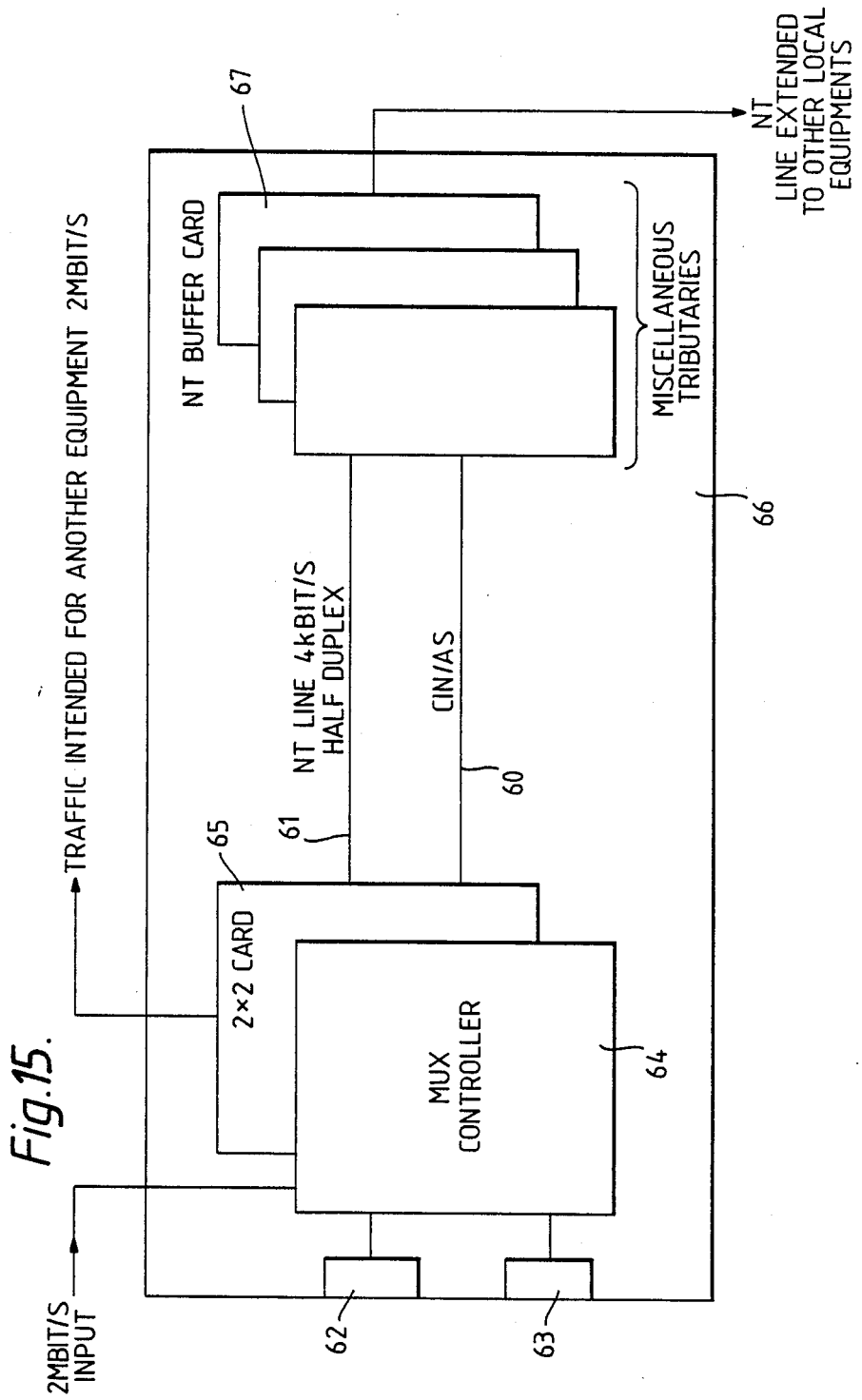
FIGS. 15 and 16 are simplified block diagrams explanatory of the network management functions of the equipment of FIG. 1.

An equipment such as shown in FIG. 1 has two network management communication channels, one of which, 60, FIG. 15, is a selectable rate RS232 connection using the CIN and AS buses referred to above. The other such channel is a 4 kbit/sec. channel 61 using a spare bit in the timeslot 16 of the 2 Mbit/sec. PCM stream. Both channels use an asynchronous character-based message format which conforms to the DATAFO protocol specification.

FIG. 15 shows the arrangement in simplified form, and it will be seen that it can be managed remotely from an intelligent terminal via an input 62, or from a simple hand held controller via another input 63. Both of these inputs are of the RS232-V24 type. These inputs go to the Mux Controller 64, with its 2 Mbit/sec. input. Associated with this is a so-called 2×2 card 65 which gives access via a 2 Mbit/sec highway to another similar equipment. This card also gives the controller 64 access to the two channels 60, 61, which extend to miscellaneous (subscriber line, etc.) tributary cards 66 and an NT buffer card 67. This latter gives access to other local equipments of the same type, and also allows the NT line to be extended between several cards on the same backplane.

Figure 16:
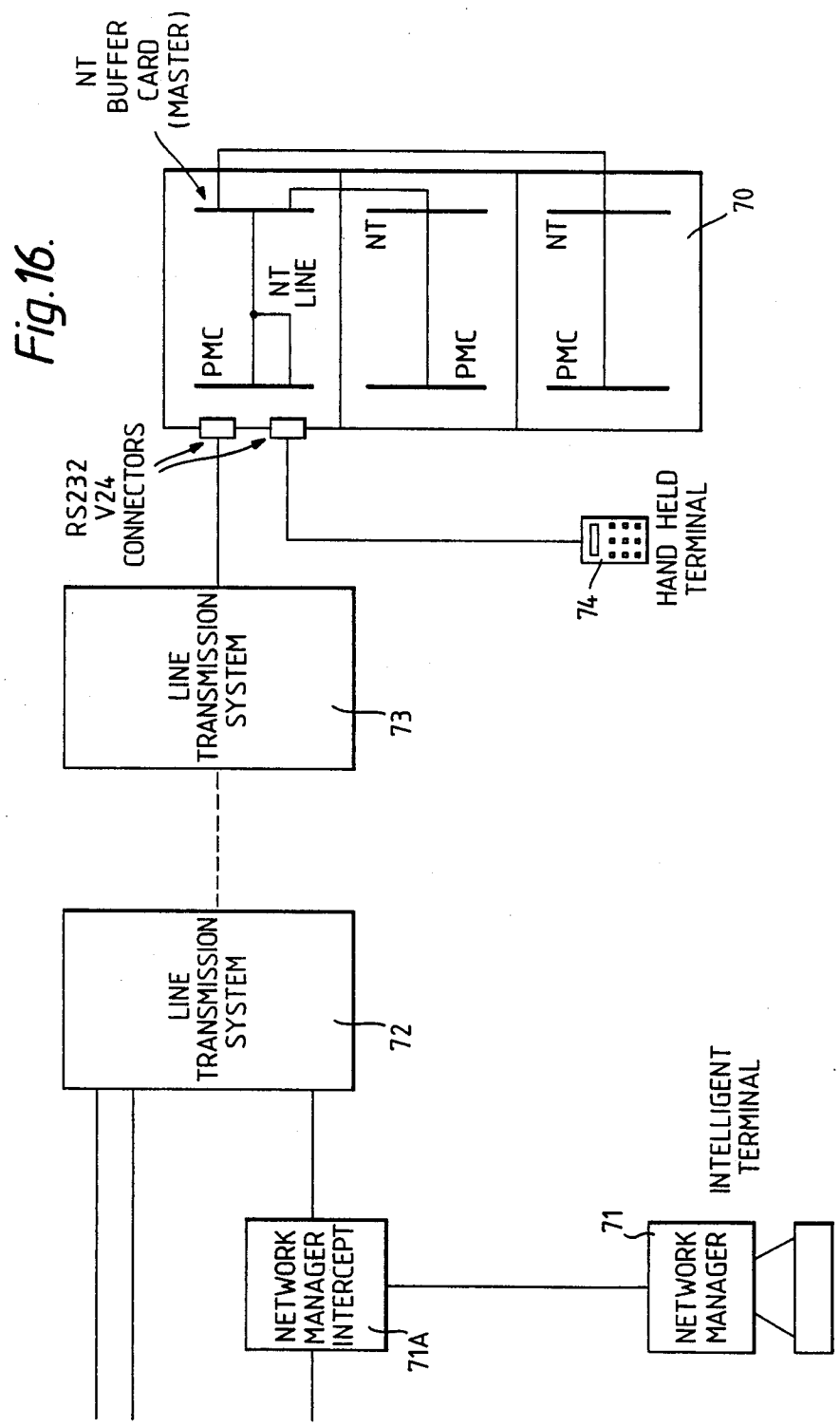

The use of the NT card as a buffer to other similar equipments can be seen in FIG. 16. Here we have an equipment rack 70, which contains three similar equipments each with its MUX control Card PMC and NT buffer card shown. The uppermost equipment is the master equipment from the control aspect.

Here we see the network manager intelligent terminal 71 from which information for setting up the various equipments is obtained. This passes from the terminal via a network manager interrupt unit 71A to the transmission system 72, 73 from which it reaches one of the RS232-V24 connectors of the master equipment. The other similar connector is fed from the hand held terminal 74.

The network on which the equipment is working may be connected with the NW manager 71 on the RS232 or the TSO link channel, as it can accept and respond to messages from either. It does not respond to a message with a destination address different from the expected one in slave mode. However, if it is required to extend the network from the TSO link to the RS232 or vice versa then the equipment does this providing that it is in Master mode, as is the case for the upper equipment in rack 71.

In Master mode an equipment follows the message protocol for messages with a non-matching destination address; it then re-transmits the entire message onto the second part of the network. For global messages, it both responds and forwards in Master mode.

The alternative to Master mode is Slave mode. In slave mode, no messages are forwarded and only messages with either the correct address or a global address are responded to.

Network Management Uses fall into two broad categories, control and monitoring. The control category allows complete remote configuration of the equipment and interrogation of the configuration as a confirmation or fault location aid. There are two major control areas, tributary card configuration and configuration of inter-card communications. Note that the network address is a MUX/Control card parameter and must be initialised before connecting to a network.

Tributary cards have control parameters that give functional level control over the operation of the hardware. Examples of control parameters are timeslot allocations, alarm priorities, audio gains etc.

A configured tributary card has an associated parameter list stored in Non-volatile (EEPROM) and changes to this parameter list cause changes to the operational data sent to the tributary by network management.

Before a tributary card becomes active it must have a parameter list associated with it; the process of initialising the parameter list is called card configuration. A tributary card parameter list is addressed by the physical location of the card within the shelf. This physical location is referred to as the slot, which must not be confused with the timeslot in which the tributary card operates. The slot requires 2 characters to specify it. The parameter list is provided into circuits. A circuit is often used to group a set of parameters where some logical division exists. A single circuit normally holds all the parameters that are associated with a single timeslot access unit, or channel. In addition there may be circuits that hold parameters concerned with alarm priority or parameters that control the tributary card as a whole, or the external interfaces in the case of multiplexers et.

The quantity of circuits and the means of accessing them is tributary type dependent. Broadly speaking there will be circuits numbered 01 up to the number of channels on the card and optionally circuits numbered A1, A2 etc., which refer to the card as a whole. Circuit numbers are always 2 characters.

The arrangement of parameters within each circuit is tributary-type dependent. The circuits associated with single channels will normally have the same format as each other. Parameters are numbered separately for each circuit from 00 to the number of parameters of the circuit −1. The parameters are numbered in ASCII coded decimal and parameter numbers are always represented as two characters with a leading zero where necessary.

The tributary type is defined by the card identity (ID), which is the one read from the card by the core software and is unique. The ID identifies the software which must be used to control the card. Any configuration of software can cope with a limited number of card types. It is possible to obtain a list of possible card ID's from an equipment over the network. It is envisaged that for each card ID, for which a card exists and is configureable over the network, there will be a corresponding software module in the network manager.

The equipment has four data buses, containing two data highways each for timeslot-related data and an identical set for timeslot-related signalling. To define telephony connections between two timeslot access units it is necessary that the two units work on the same bus in the same timeslot, but in opposite directions. This triplet of parameters is referred to as the timeslot allocation of a channel. There is a standard form in which the timeslot allocation is expressed for timeslot access units which are flexible in their use of buses, directions and timeslots (not all are fully flexible). The format of the timeslot allocation is: BDXX - Where:

(a) B, is the bus number and can take the values space or 0 (these are equivalent), 1, 2 or 3.
(b) D, is the direction and takes the value T or R. Direction = T is as a standard tributary and R is as the MCC (Mux Controller).
(c) XX, is the timeslot between 00 and 31. The timeslot value 00 is an inactive timeslot allocation.

For any timeslot allocation it is possible to determine which physical channels are active and from this information it is possible to modify the timeslot allocation.

It is possible to so divide the data highways that multiple sets of 16 highways are in use. The timeslot allocations of each set are independent and no telephony or signalling data can cross from one set to another over the backplane. In this case the sets of data highways are known as systems. The Mux Controller can control up to 4 systems and they are referred to as systems 0 to 3. A standard equipment has only one system and this is system 0.

Monitoring of the equipment is concerned with obtaining and maintaining a list of active alarms. The possible list of alarms is variable according to configuration, so the list of active alarms is of variable length and format. For this reason the reporting of active alarms is done by sending an alarm descriptor to the equipment and receiving either the status of that alarm of the descriptor of the next active alarm in return. Once an alarm has occurred twice in the list or the alarm descriptors overlap then a complete list of active alarms has been read back.

The alarm descriptor contains the physical location of the alarm (the slot) and also an alarm number in ASCII coded decimal (2 digits) from 01 to 99. If alarm number 00 is used in an "enquire next alarm" descriptor message then the search is forced to begin with alarm 01 of the specified slot.

A number of message types are used which are not listed in detail. However, the message body begins with a message classification character and sub-classification. Message types include:

(i) "Are you there", which checks that the network is operational and is only used if no traffic has been sent to a node for a preset period. The return message includes the equipment's core software number.
(ii) Serial link test, used to re-activate an inactive node. If it is received by an active equipment no action occurs. However, if it reaches a node which is inactive, it waits until five such messages have been received correctly before the channel is declared active. Thus there is no response from an inactive channel.

There are also messages for requesting network status, requesting timeslot allocation etc.

Error checking is used, and if an error is noted a repeat is requested.

Figure 14:
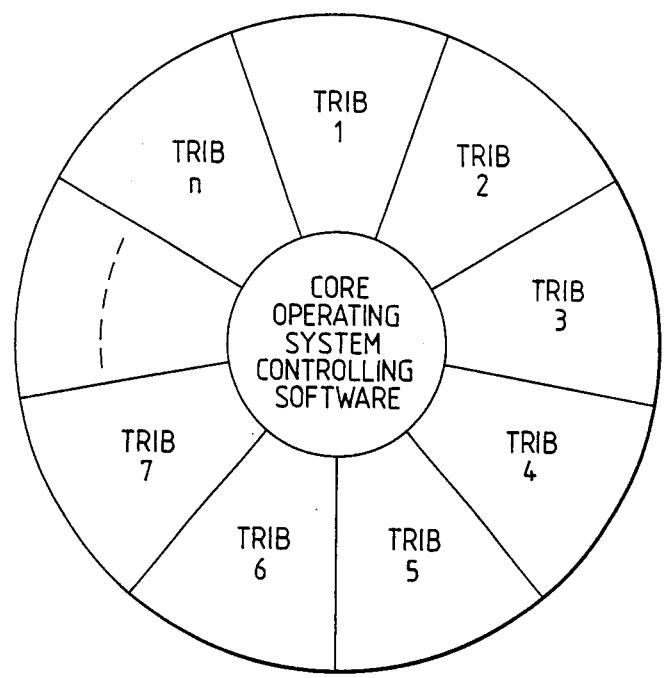

FIG. 14 indicates in simple form the overall structure of the control software of an equipment.

Every system, no matter what configuration of tributary types, has a 'core' system software in the mux controller EPROM. This software is used to drive low level hardware as well as perform the mux/demux function and timeslot allocation. The system software core is in effect surrounded by layers of tributary specific software, ever increasing as additional tributary software peripheral packages are added. The cumulative total is an EPROM equipped with all preceding software packages as well as the latest, designed specifically for the new tributary. If a customer wishes to have the latest cards but his EPROM is loaded with earlier generation software, then it is simply a matter of unplugging an EPROM and replacing it with the latest generation EPROM.

We claim:

1. Data transmission equipment, which includes a control unit which exercises overall control of the operations of the equipment and one or more tributary units, said units being interconnected by respective bus conductors of a common bus structure to which all of said units are connected, all transmissions over the bus structure being digital, wherein:
   (a) a high bit-rate incoming and outgoing digital trunk is coupled to the control unit when the equipment is in use;
   (b) said tributary units each provide interfaces for one of more digital highways of lower or equal bit rate than that of said high bit rate trunk, or for one or more analogue channels, which said highways include one or more highways to subscriber stations;
   (c) the control unit controls the establishment, maintenance and breakdown of connections between the high bit rate trunk and said digital highways and analogue channels, such that the control unit is involved in the establishment of all connections set up through the equipment;
   (d) the respective bus conductors which interconnect the control unit and the tributary units are allocated time slots for connections between the said high bit-rate trunk and respective ones of said highways or channels, wherein such a connection can be allocated one or more of said time slots dependant on the bandwidth required, which allocation is effected under the control of the control unit;
   (e) connections between the control unit and such of the tributary units as are present being effected by messages sent over the bus structure, each of which messages is addressed with the address of the unit for which that message is destined, and is sent at a time slot allocated to the bus structure for the connection to which it relates;
   (f) the address of a said tributary unit is responded to by address responsive means in that tributary and relates to that unit as such and not to its location in the equipment, whereby a said tributary unit can be located anywhere in the equipment without alteration of its address;
   (g) said tributary units can handle different customer services, which may require different bandwidths; and
   (h) the control unit includes memory means in which details of the current allotments of time slots and bus conductors to the customer services of all of the tributary units are stored.

2. Equipment as claimed in claim 1, in which the common bus structure includes a printed circuit board which carries a number of tracks each of which provides one of the bus conductors of the structure, and in which the control unit and the tributary units each include at least one printed circuit card set substantially at right angles to the common bus structure.

3. Equipment as claimed in claim 2, in which the bus structure's board is at the back of an equipment rack with guides for the reception of said cards, and in which each said card has a plug connector at its inner end receivable in a socket connector on the board.

4. Equipment as claimed in claim 2, and which includes a backplane structure mounted behind and parallel to said circuit board, for providing access from the rear to the said circuit board.

5. Equipment as claimed in claim 1, in which the bus conductors include for data n pairs of busses each of which include separate transmit and receive highways as seen by the said control unit.

6. Equipment as claimed in claim 5, in which time slot allocation is effected by sending a message via the said bus conductors at a said allocated time slot to the tributary unit to which that time slot is allocated, and in which said message includes the address of the tributary unit for which it is destined, the appropriate tributary unit responding to its own address.

7. Equipment as claimed in claim 6, in which the bus structure includes one or more bus conductors which are not connected to the control unit, and in which such one or more bus conductors are each connected to two or more tributary units, being used for communications between tributary units.

8. Equipment as claimed in claim 1, wherein connection to the said units are made at the outer ends of those units, which are at the front of the rack.

9. Data transmission equipment for handling data in digital form in time division multiplex manner, which includes a control unit which includes connection processing means which exercises overall control of the operations of the equipment, one or more tributary units, at least one additional processing unit which serves all of said tributary units, said additional processing unit being physically separate from the control unit and the tributary units, and a common bus structure to which all of said units are connected, all transmissions over the bus structure being digital, wherein:
 (a) the control unit also controls an interface for at least one high bit-rate incoming/outgoing trunk coupled to the control unit, while each said tributary unit acts an an interface to one or more other data highways, which other highways may include lower bit-rate highways giving access to subscriber stations or analogue channels;
 (b) the control unit controls the establishment, maintenance and breakdown of connections between the high bit-rate trunk and said digital highways and analogue channels;
 (c) a said additional processing unit handles data appropriate to the connections in the process of establishment, or already established, via the equipment, which data is additional to the intelligence content of said connections;
 (d) a said additional processing unit effects said data handling by monitoring the bus structure to ascertain the data or other information thereon relating to the connection;
 (e) a said additional processing unit responds to the results of its said monitoring of the bus structure to generate further data or other information which is applied to the bus structure in a manner appropriate to the connection to which it relates; and
 (f) a said additional processing unit effects said monitoring and generation separate from the operations of the control unit and under the control of its own software.

10. Equipment as claimed in claim 9, wherein the additional processing unit, or one of said additional processing units, handles signalling for the connections through the equipment.

11. Equipment as claimed in claim 9, wherein the additional processing unit, or one of said additional processing units, handles tone generation for the calls and also handles the recognition of tones already present on the bus structure.

12. Equipment as claimed in claim 9, wherein there are two additional processing units, wherein the first of said additional processing units handles signalling for the connections through the equipment, and wherein the second of said additional processing units handle tone generation for the calls and also handles the recognition of tones already present on the bus structure.

13. Equipment as claimed in claim 9, wherein the characteristics of the tributary units are set up by the transmission of information appropriate to those units from a network management source.

14. Equipment as claimed in claim 13, and which includes two channels for conveying messages from the control unit to the other cards, one of which is a high bit-rate full duplex channel using two separate buses on the bus structure and the second of which is a relatively low bit-rate half duplex channel using one bus on the bus structure.

15. A data transmission system which includes a plurality of equipments each as claimed in claim 14, and interconnection between the busses of said equipments wherein one of said equipments is a master equipment and the other or other are slave equipments, wherein messages for all said equipments are routed to the master equipment from which they are routed via said interconnections to the slave equipments, and wherein messages in the reverse direction are similar sent in the reverse direction.

* * * * *